United States Patent
Hill et al.

(10) Patent No.: US 8,784,932 B2
(45) Date of Patent: Jul. 22, 2014

(54) GLASS PANELS PARTIALLY PRINTED WITH CERAMIC INK LAYERS IN SUBSTANTIALLY EXACT REGISTRATION

(75) Inventors: George Roland Hill, Stockport (GB); Howard Quinn, Stoke-on-Trent (GB)

(73) Assignee: Contra Vision Limited, Stockport (GB)

( * ) Notice: Subject to any disclaimer, the term of this patent is extended or adjusted under 35 U.S.C. 154(b) by 1572 days.

(21) Appl. No.: 10/529,367

(22) PCT Filed: Sep. 29, 2003

(86) PCT No.: PCT/GB03/04216
§ 371 (c)(1),
(2), (4) Date: Oct. 14, 2005

(87) PCT Pub. No.: WO2004/030935
PCT Pub. Date: Apr. 15, 2004

(65) Prior Publication Data
US 2006/0150680 A1      Jul. 13, 2006

(30) Foreign Application Priority Data
Oct. 2, 2002   (GB) .................................. 0222765.0

(51) Int. Cl.
| | | |
|---|---|---|
| B41M 3/12 | (2006.01) | |
| C03C 17/34 | (2006.01) | |
| B44F 1/06 | (2006.01) | |
| B32B 17/10 | (2006.01) | |
| B44C 1/17 | (2006.01) | |
| B41M 1/34 | (2006.01) | |
| B41M 5/26 | (2006.01) | |
| B41M 3/00 | (2006.01) | |

(52) U.S. Cl.
CPC .............. B44C 1/1712 (2013.01); B41M 5/265 (2013.01); B44F 1/06 (2013.01); B32B 17/10247 (2013.01); B41M 1/34 (2013.01); B41M 3/003 (2013.01)
USPC .............. 427/148; 65/60.2; 65/33.6; 65/60.5; 65/60.53

(58) Field of Classification Search
CPC ........ C03C 17/34; C03C 17/02; B44C 1/162; B44C 1/175; B44C 1/1756
USPC .............. 65/60.2, 33.6, 60.5, 60.53; 427/201, 427/202, 204, 258, 279, 198, 264, 270, 193, 427/199, 226
See application file for complete search history.

(56) References Cited

U.S. PATENT DOCUMENTS 1,467,111 A * 9/1923 Lessell .......................... 427/259
1,905,565 A * 4/1933 Lind .............................. 427/264

(Continued)

FOREIGN PATENT DOCUMENTS

| EP | 1 207 050 A2 | 5/2002 |
| EP | 0 880 439 B1 | 6/2002 |

(Continued)

OTHER PUBLICATIONS

"Total Ink Coverage too high"—printplanet.com—http://printplanet.com/forums/color-management/21677-total-ink-coverage-too-high—Accessed Feb. 28, 2014.*

Primary Examiner — Jason L Lazorcik
(74) Attorney, Agent, or Firm — Pillsbury Winthrop Shaw Pittman LLP

(57) ABSTRACT

A glass panel is partially printed with a plurality of layers in the form of a print pattern which subdivides the panel into a plurality of discrete printed areas and/or a plurality of discrete unprinted areas, the layers being in substantially exact registration. Exact registration is achieved by the application of a plurality of superimposed layers to a sheet of glass. One layer contains-ceramic ink comprising glass frit. The glass sheet and layers are subjected to a heat treatment process which causes the glass frit to fuse to the glass and bind at least one other layer of ink within the print pattern. Ink outside the print pattern is burnt off and/or vaporised during the heat treatment process and/or removed by a subsequent finishing process, to leave the desired layers in substantially exact registration within the print pattern.

40 Claims, 37 Drawing Sheets

(56) References Cited

U.S. PATENT DOCUMENTS

| | | | | |
|---|---|---|---|---|
| 2,970,076 | A | * | 1/1961 | Porth ........................ 156/89.23 |
| 3,769,055 | A | * | 10/1973 | Blanco ........................ 427/147 |
| 3,857,746 | A | * | 12/1974 | Blanco et al. ............ 156/89.24 |
| 3,898,362 | A | * | 8/1975 | Blanco ........................ 428/432 |
| 3,956,558 | A | * | 5/1976 | Blanco et al. ............ 428/204 |
| 4,126,728 | A | * | 11/1978 | Holleran et al. ............ 428/204 |
| 4,321,778 | A | * | 3/1982 | Whitehead ............ 52/204.591 |
| 4,673,609 | A | * | 6/1987 | Hill ........................ 428/187 |
| 4,847,181 | A | * | 7/1989 | Shimokawa ................ 430/297 |
| 4,925,705 | A | * | 5/1990 | Hill ........................ 427/259 |
| 4,971,858 | A | * | 11/1990 | Yamano et al. ............ 428/32.5 |
| 5,132,165 | A | * | 7/1992 | Blanco ........................ 428/210 |
| 5,409,742 | A | * | 4/1995 | Arfsten et al. ................ 427/555 |
| 5,665,472 | A | * | 9/1997 | Tanaka et al. ............ 428/32.71 |
| 5,830,529 | A | * | 11/1998 | Ross ........................ 427/152 |
| 6,075,223 | A | * | 6/2000 | Harrison ................ 219/121.85 |
| 6,117,509 | A | * | 9/2000 | Lee ........................ 428/40.1 |
| 6,238,847 | B1 | * | 5/2001 | Axtell et al. ................ 430/322 |
| 6,481,353 | B1 | * | 11/2002 | Geddes et al. ............ 101/491 |
| 6,503,310 | B1 | * | 1/2003 | Sullivan ................ 106/31.6 |
| 6,629,792 | B1 | * | 10/2003 | Geddes et al. ............ 400/241 |
| 6,767,609 | B2 | * | 7/2004 | Aeling et al. ................ 428/137 |
| 6,796,733 | B2 | * | 9/2004 | Geddes et al. ............ 400/241 |
| 6,824,639 | B1 | * | 11/2004 | Hill et al. ................ 156/230 |
| 6,893,725 | B2 | * | 5/2005 | Hayashi et al. ............ 428/432 |
| RE39,044 | E | * | 3/2006 | Ross ........................ 427/152 |
| 7,204,884 | B2 | * | 4/2007 | Lunsford et al. ............ 118/641 |
| RE40,024 | E | * | 1/2008 | Hill ........................ 428/194 |
| 7,507,453 | B2 | * | 3/2009 | Geddes et al. ............ 428/32.79 |
| 2009/0181231 | A1 | * | 7/2009 | Koops et al. ................ 428/220 |

FOREIGN PATENT DOCUMENTS

| | | | |
|---|---|---|---|
| GB | 1094104 A | * | 12/1967 |
| GB | 2 118 096 A | | 10/1983 |
| GB | 2 165 292 A | | 4/1986 |
| GB | 2 174 383 A | | 11/1986 |
| GB | 2 188 873 A | | 10/1987 |
| WO | WO 98/43832 | | 10/1998 |
| WO | WO 00/46043 | | 8/2000 |
| WO | WO 0046043 | * | 8/2000 |

* cited by examiner

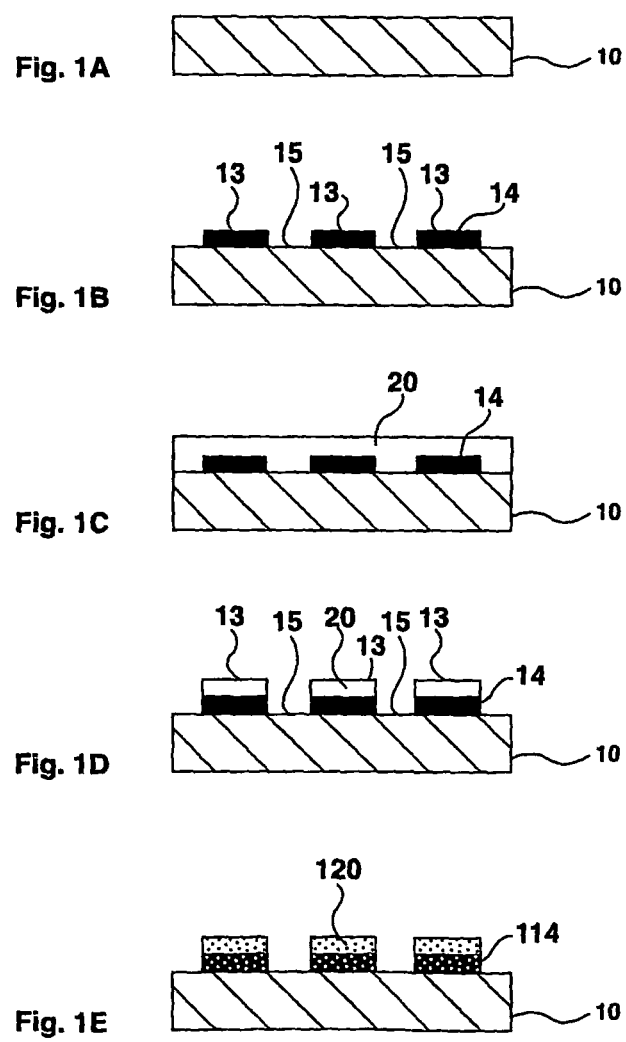

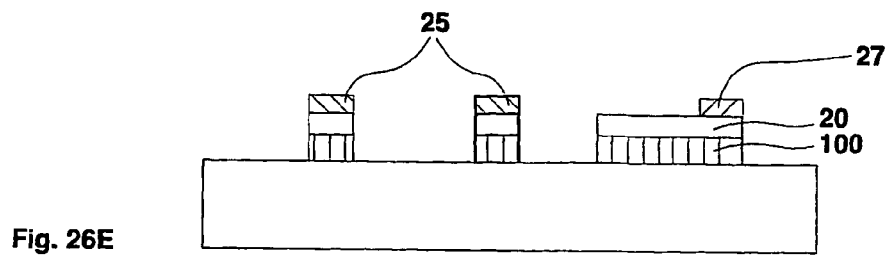
Fig. 26E
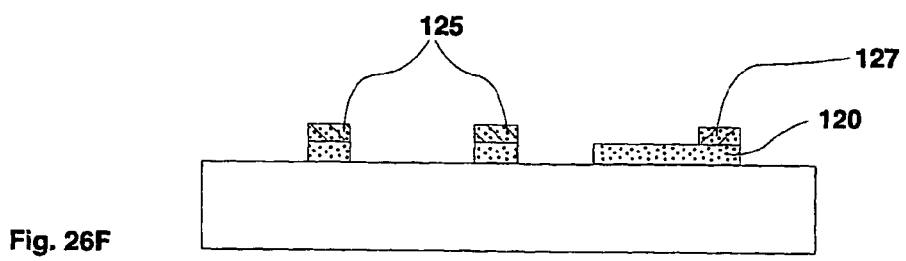
Fig. 26F
Fig. 26G
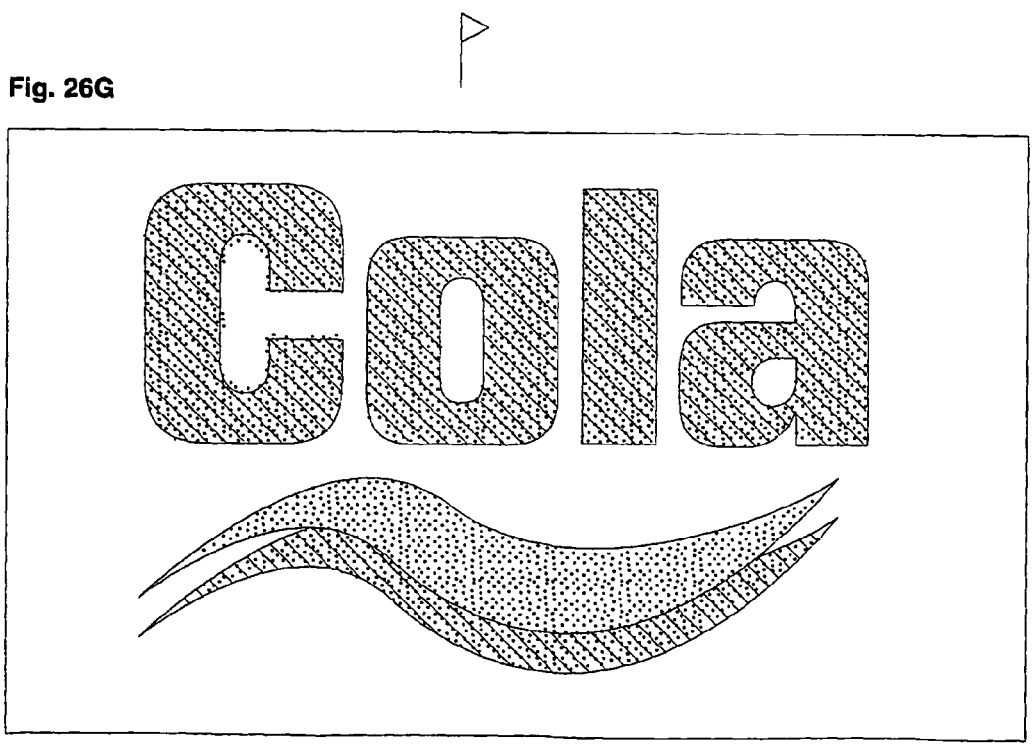

though the firing
GLASS PANELS PARTIALLY PRINTED WITH CERAMIC INK LAYERS IN SUBSTANTIALLY EXACT REGISTRATION This is the U.S. National Stage of International Application No. PCT/GB2003/004216, filed Sep. 29, 2003, which relies for priority upon GB 0222765.0, filed Oct. 2, 2002, the contents of both of which are incorporated herein by reference in their entireties.

SUMMARY OF THE INVENTION

This invention concerns the partial printing of glass panels with ceramic ink in a plurality of layers in substantially exact registration. The substantially exact registration is achieved by the printing of superimposed layers of ink, one of the layers containing glass frit in a "print pattern". These layers of ink may be applied directly to a sheet of glass or be transferred as a decal onto a sheet of glass. The glass and the applied layers of ink are subjected to a heat treatment which causes the glass frit to fuse to the glass and bind at least one layer of ink above or below the layer containing the glass frit. The ink not within the print pattern is burnt off in the heat treatment process and/or otherwise removed in a subsequent finishing process, to leave the desired layers of ceramic ink in substantially exact registration within the print pattern. The invention can be used for the manufacture of one-way vision panels and other products in which the substantially exact registration of layers of ink with at least one common boundary on glass is desired. Alternatively, areas of ink with spaced apart boundaries are laterally registered one to the other.

BACKGROUND TO THE INVENTION

Ceramic printing on glass is well known. U.S. Pat. No. 4,321,778 (Whitehead), GB 2 165 292 (Hill), WO 00/46043 (Hill and Clare), WO 98/43832 (Pearson) and U.S. Pat. No. 5,830,529 (Ross) disclose partially printed glass panels with a plurality of superimposed layers, variously described as one-way vision panels, vision control panels or see-through graphics panels, and methods of producing such panels. GB 2 165 292 describes several methods for the partial printing of a transparent substrate with an opaque "silhouette pattern" comprising layers of ink in substantially exact registration, to produce a panel having a design visible from one side but not visible from the other side and, typically, a black layer facing the other side to maximise "through vision" from the other side. Three of these methods are referred to as the "direct", "stencil", and "resist" methods, all of which involve the removal of cured ink to leave the desired "silhouette pattern" in substantially exact registration. This removal of unwanted ink is undertaken by the application of an overall force applied to the superimposed layers of ink (in the case of the direct and stencil methods) or an overall application of solvent in the case of the resist method. GB 2 188 873 (Hill) discloses improvements to these methods of printing with substantially exact registration and discloses the lateral registration of separately printed areas of ink. WO 00/46043 (Hill and Clare) discloses a range of methods of printing such panels with ceramic ink in substantially exact registration, unified by the printing of superimposed layers onto a base layer and the removal of unwanted ink by a selective force.

Ceramic ink typically comprises glass "frit", metal oxide pigments and an ink medium, typically of solvent, resin and plasticiser, in which the pigment and frit are suspended. Frit is glass which has been melted and quenched in water or air to form small particles, which are then ground or "milled" to a desired maximum particle size, typically 10 micron. Ceramic ink may contain oil such as pine oil. Ceramic inks can be opaque or translucent. The ink medium is sometimes referred to as just a medium, a binding medium or a matrix.

Solvent in a ceramic ink medium evaporates following printing, in an ink drying or curing process, leaving resin and plasticiser in the interstices between the glass frit and any pigment.

Removal of this resin and plasticiser matrix in the firing of ceramic inks is potentially problematical and a "slow-firing" regime is generally considered preferable, although the firing of ink in a relatively short toughening cycle is known in the art.

The glass is optionally toughened, sometimes referred to as tempered, in the heat treatment process, typically as a second stage following a first stage slow heat treatment process or "ink fusing regime" in which the print pattern is fused to the glass. GB 2 174 383 B (Easton and Slavin) discloses methods of decorating glass with ceramic ink by means of waterslide transfer and a single stage toughening and decal fusing process.

Another type of vision control panel is described EP 088 0439A, comprising a transparent or translucent sheet and a transparent or translucent "base pattern" of a different colour to the "neutral background" of the sheet.

Known methods of ceramic decal transfer include:
(i) indirect transfers, for example waterslide transfers and indirect heat release transfers, and
(ii) direct transfers, for example direct heat release transfers.

A transfer process comprises material to be transferred, commonly referred to as a decal (abbreviation of decalcomania), being transferred from a transfer carrier, commonly referred to as a decal carrier, onto a substrate surface.

An indirect transfer method is one in which the means of release of the decal from the decal carrier and the means of adhering the decal to the substrate are typically combined in a single layer on the transfer carrier. The decal is first removed from the carrier and then positioned on the substrate by means of a pad, roller, by hand or other intermediate surface or means.

For example, a ceramic ink waterslide transfer typically comprises a mass produced decal carrier, typically a specially prepared paper with a sealant layer and a water-soluble adhesive layer. This is optionally printed or otherwise coated with a downcoat, typically a methyl methacrylate based lacquer. It is then printed with the desired layers of ceramic ink forming the required image and then a covercoat is applied, typically a butyl or methyl methacrylate based lacquer. This transfer assembly is typically soaked in water and the decal comprising the covercoat, ceramic ink, optional downcoat and some adhering water-soluble adhesive is released from the carrier and then applied to the substrate surface to be decorated, typically by hand.

As another example, an indirect ceramic ink heat release transfer typically comprises a mass-produced decal carrier, comprising a paper, a sealant layer, a combined heat-activated release and adhesive layer, typically a modified wax incorporating an adhesive or tackifier blend. This is optionally printed or otherwise coated with a downcoat, typically a methyl methacrylate lacquer. It is then printed with the desired layers of ceramic ink and then a covercoat is applied, typically a butyl or methyl methacrylate based lacquer. The decal is then released by applying heat, typically by a heated steel plate under the paper, which activates the release/adhesive layer and allows the decal to be removed from the carrier and then be transferred to and adhered to the substrate to be decorated via an intermediate pad, roller or by hand.

A direct transfer method is one in which a transfer assembly is applied directly to a substrate and the decal carrier is released and removed, leaving the decal on the substrate.

For example, a direct ceramic ink heat release transfer typically comprises a mass-produced decal carrier comprising paper, a sealant layer and a heat release layer, typically a polyethylene glycol (PEG) wax. This is optionally printed with a covercoat, typically a film-forming covercoat, for example of butyl or methyl methacrylate. It is then printed with the desired layers of ceramic ink. Any design is printed in reverse to its intended orientation from the ink side of the substrate. Then a heat-activated adhesive layer is applied, for example a methacrylate resin. This transfer assembly is then typically positioned directly against the substrate with the adhesive layer against the substrate surface. Heat is applied via the paper, which simultaneously activates the adhesive layer and the separate heat release agent. This enables the decal of adhesive, ceramic ink and any covercoat to be adhered to the substrate and be transferred from the carrier, the carrier being released and removed from the decal and substrate. The substrate may optionally be pre-heated.

The terms "covercoat" and "downcoat" are always used in relation to their position with respect to the substrate, a covercoat being a layer over the ink on the substrate and a downcoat being a layer adhered to the substrate, underneath the ink on the substrate.

Typical substrates onto which ceramic decals are transferred include ceramic holloware, ceramic flatware, hollow glassware and flat glass.

All of the above transfer materials and methods are well known in the art.

Many automatic methods of decal application have been devised, for example all the mechanical processes, firing ovens and furnaces described in WO 98/43832.

After ceramic ink is applied to a normal sheet of flat glass, sometimes referred to as float glass and sometimes referred to as annealed glass, the printed sheet of glass is then typically subjected to a thermal regime of up to a temperature of typically 570° C., which burns off all components of the ceramic ink other than glass frit and pigment and melts the glass frit and fuses the remainder of the ink onto the glass, typically followed by relatively slow cooling to anneal the glass once again, which process will be referred to as an "ink fusing regime". Optionally, annealed glass substrates with ceramic ink can undergo a tempering or toughening regime, which involves raising the glass temperature to typically between 670° C. and 700° C., in which temperature range the glass is relatively soft, and then cooling it relatively quickly, typically by cold air quenching. This causes differential cooling of the glass sheet, the two principal surfaces solidifying before the core solidifies. The subsequent cooling and shrinkage of the core causes a zone of precompression adjacent to each principal surface. The physical strength properties of the glass sheet are fundamentally changed by this glass tempering or toughening regime, which imparts a considerably improved flexural strength to the resultant tempered or toughened glass. Such a glass tempering or toughening regime may be carried out after a separate ink fusing regime or as one process, the ink being fused onto the glass as part of that one process.

With either the ink fusing regime or the glass tempering regime, any transfer process adhesive, covercoat, downcoat and ceramic ink medium are burnt off in the furnace and do not form part of the resultant panel.

It is known in the art to print a design using ceramic ink with a relatively low proportion of glass frit, to intensify the perceived colours, and then overprint with an overall layer of clear transparent ceramic ink with glass frit, sometimes referred to as flux, to "bind in" the pigments below. U.S. Pat. No. 3,898,362 (Blanco) discloses a method of producing an overglaze ceramic decal by wet printing a design layer, free of glass, on a backing sheet and separately depositing a protective coating of pre-fused glass flux on the wet design layer. U.S. Pat. No. 5,132,165 (Blanco) and U.S. Pat. No. 5,665,472 (Tanaka) disclose improvements to this process. Blanco also discloses the prior art lithographic decal method of printing a layer of the desired pattern for one pigment in a clear varnish and then dusting the pigment of the entire sheet in a lithographic process, cleaning the sheet and leaving the pigment only where the varnish is. If more than one colour is required, the process must be repeated and dried between each stage.

EP 1 207 050 A2 (Geddes et al) discloses a transfer system in which a digitally printed ceramic colorant image is applied to a backing sheet followed by an overall overcoat containing frit and binder. Geddes also discloses the thermal transfer digital printing of inks without frit.

None of the prior art discloses multiple layers of ink having a single layer of ink containing glass frit to define a pattern to partially cover a substrate, a cross-section through which comprises alternate printed portions and unprinted portions.

THE INVENTION

According to the present invention, there is a method of making a glass panel that is partially printed with a plurality of layers in the form of a print pattern which subdivides the panel into a plurality of discrete printed areas and/or a plurality of discrete unprinted areas, said layers being in substantially exact registration, said method comprising the steps of:

(i) applying a plurality of layers to a sheet of glass, wherein one of said layers comprises a ceramic ink comprising glass frit in the form of said print pattern, and another of said layers does not comprise glass frit, (ii) subjecting said sheet of glass and said plurality of layers to a heat treatment process wherein said glass frit melts and fuses with said sheet of glass and binds said another of said layers within said print pattern, and (iii) the parts of said another of said layers outside said print pattern are burnt off and/or vapourised during said heat treatment process and/or are removed by a subsequent finishing process.

The applied layer or layers without glass frit are typically otherwise similar to ceramic ink, comprising pigment and a binding medium or matrix, typically of solvent, resin and plasticiser or comprising a pigment and a medium of curable resin, for example UV curable resin.

The layers of ink are typically screenprinted directly onto the glass or are applied to the glass in the form of a decal transferred from a pre-printed decal carrier material. Decals can be indirectly applied, for example waterslide transfer decals, but preferably are directly applied from a carrier, typically by means of heat and pressure.

The ceramic ink layer containing the glass frit typically has a high proportion of glass frit, as the glass frit is required to migrate in the heat treatment process into at least one other layer, sometimes referred to herein as a frit-loaded ceramic ink.

The frit-loaded ceramic ink layer defining the print pattern may be applied by printing the glass or by indirect decal or by direct decal, either:

(i) onto the glass panel surface, referred to herein as a "down print pattern", or
(ii) onto the exposed top surface of the other layer or layers, referred to herein as a "top print pattern", or
(iii) between other layers, referred to herein as an "intermediate print pattern".

The transfer of decal ink onto the glass surface may be done in a single stage or multiple stages.

The previously described methods can be intermixed, for example a glass frit "down print pattern" could be first applied to a sheet of glass by direct screen printing, to be followed by the other layer or layers in the form of a decal. Alternatively, a glass frit "down print pattern" can be first applied by decal, followed by the other layer or layers by directly printing the glass panel or by means of a separate decal.

The heat treatment process preferably comprises an initial heat treatment in which the printed panel is slowly heated, for example at a temperature of 570° C., in order to slowly burn off the resin and plasticiser matrix, in order to minimise the potential for pin holes, "frizzle" reticulation of the ink and other potential defects caused by rapid firing. Ceramic ink typically comprises inert pigments, typically metal oxides or precious metals or other material that will not be "burnt off" in the firing cycle. Following firing, the resin and plasticiser matrix in the ceramic ink will be substantially "burnt off", leaving just the pigment in dust form on the areas of glass outside the print pattern, the glass surface remaining plane without any resultant optical distortion. The unwanted pigment powder can be removed in a subsequent process, for example by vacuum suction, optionally in the form of a "vacuum knife", water jetting or air jetting. If the glass is required to be toughened, this would typically be undertaken in a following heat treatment process, which involves raising the glass temperature to typically between 670° C. and 700° C., in which temperature range the glass is relatively soft, and then cooling it relatively quickly, typically by cold air quenching. This faster following toughening process, including air quenching, can then be undertaken without the pigment dust being blown about in the air quenching process.

The method typically depends upon the migration of melted glass frit from one layer to the other layer or layers which underlie or are superimposed over the layer defining the print pattern or the settlement of pigment into a molten frit layer. This migration or settlement takes place through one or a combination of the following mechanisms:

(i) gravity,
(ii) capillary action (caused by surface tension),
(iii) movement, for example by expansion, of frit-laden molten resin and plasticiser prior to the resin and plasticiser vapourising in a heat treatment furnace,
(iv) suction, for example suction caused by the burning off of the resin matrix from an upper ink layer, causing a partial vacuum in the interstices of the ink formerly containing the matrix materials,
(v) vacuum or partial vacuum caused by the exhaustion of an autoclave, which provides both the heat treatment and vacuum/exhaustion capability,
(vi) pressure applied in an autoclave which provides both the heat treatment and pressure capability, or
(vii) centrifugal force.

It is known that the thorough drying or curing of each layer of ink is very important to the successful production of products with superimposed layers of ceramic ink to minimise undesirable interaction between layers, such as the migration of pigment from one layer to another.

Instead of the heat treatment being applied after the application of all layers of ink, heat treatment may be applied at any stage, providing that the print pattern has previously been applied. For example, a "down print pattern" of ceramic ink could first be applied, followed by a first heat treatment to melt and fuse only that one layer, to be followed by the application of the subsequent layer or layers of ink and a second heat treatment process. This enables the resin matrix in the first layer to be burnt off in the initial heat treatment stage, thus reducing the amount of matrix to be burnt off in the final heat stage and, more importantly, maximise on the potential migration of molton frit into the upper layer or layers by virtue of the suction forces caused by the burning off of resin matrix in the upper layer or layers, coupled with any capillary action movement of the molton frit upwards or gravitational effect of the pigment settling into the molton frit. This "down print pattern" first layer that is pre-treated is advantageously clear frit-loaded ceramic ink without any coloured pigment.

Such pre-printing of a "down print pattern" and the firing of this print pattern enables the production of treated glass which can then be regarded as stock, "part processed panels". Subsequent black and white layers can then be added to provide a uniform background for a variety of designs. The black and white layers can then be optionally heat treated and the unwanted black and white pigment outside the print pattern can be removed or they may remain as uniform layers to form alternative "part processed panels". "Part processed panels" may subsequently be printed for a range of different products, by applying one or more coloured layers in multiple production runs or one-off panels. Any required design colours can be screen, litho or digitally printed on such "part processed panels" and the imaged panels can be finally heat treated and the unwanted design colour pigment outside the print pattern removed. Designs can be of single "spot" colours or four colour process or other multi-colour process and can be "tiled" to provide an overall display, for example, over the facade of a glazed building. Any suitable printing process may be used, such as screen, litho, inkjet, electrostatic, electrophotographic, thermal transfer (for the black and/or white "opacity layers" and design pre-printed on a thermal transfer carrier or digitally printed from thermal transfer ribbons). A particularly advantageous variant of this method is based on two types of pre-printed decal carriers. One has the print pattern layer in clear ceramic ink. This print pattern layer is first transferred to a sheet of glass and prefired. The second type of pre-printed decal carrier has a black layer overprinted with one or two white layers, each without flit, that may be overprinted with a fritless ink to form a particular design and the resultant black, white and design layered decal is transferred to the glass panel with fused frit print pattern. In a second heat treatment, the frit binds the other layers to the glass panel.

The resin matrix may be transformed from solid state to gaseous state in one of two ways. With rising furnace temperature, either the solid resin is directly carbonised and "burnt off" at a so-called thermal degradation temperature, or it may pass through a molten or liquid phase before being vapourised. Different resins can advantageously be selected in different layers of ink typically to allow, in a gradually raised temperature regime, for resin in an upper layer to be "burnt off" or vapourised before the resin in the layer below it. This progressive or sequential removal of resin from different layers minimises disturbance of the layers of pigment and/or frit and the defects commonly associated with the firing of superimposed layers of ink.

When conventional ceramic ink is "fired" and the matrix is "burnt off" or vapourised, the ink layer will tend to "slump" or reduce in thickness, as the pigment moves within the melted frit, which takes up at least some of the voids between the pigment left by the resin matrix. However, with ceramic ink or ceramic type ink with the frit omitted, the resultant structure of the ink and its residual thickness following firing will mainly depend upon the nature of the "grading" or "particle size distribution" of the pigment powder. Any solid particles have a so-called "grading curve" or "particle distribution curve" which represents the proportions of different particle size ranges. This may be established and quantified by passing larger sized particles, such as stone and sand, through successive sieves with different aperture size. For smaller size particles, different techniques are required, such as the laser scattering technique, for example the HORIBA LA-920, which claims to measure particle size from 0.02 to 2000 microns. With composite materials such as ceramic ink and concrete, there can be benefit in providing a grading curve of solid materials such that finer solids tend to fill the gaps between larger solids. In concrete, sand or "fine aggregate" fills the voids between "stone aggregate". In ceramic ink finer pigment particles will also tend to fill the voids between larger pigment particles. Such a pigment particle distribution curve will tend to minimise the volume of molten frit required to bind the pigment and fuse a heat treated layer to a glass sheet and/or the other ceramic ink layers. However, it is also known in concrete and other particulate materials technologies for solids to have a "gap graded" grading curve. For example, if finer particles are omitted, there will be a higher proportion of interstices or voids between larger particles. Gap-graded pigment particles can be selected using paper filter and ultrasonic vibration techniques or air and cyclone systems. Such a gap-graded arrangement is advantageous in the present method to enable the relatively easy migration of glass frit from one layer to another and to minimise the migration of fine pigment being carried by molten resin or resin being burnt off, or molten glass frit migrating from one layer or another, which would otherwise cause undesirable mixing of colours in one or more layers. Alternatively, finely ground pigment can be carried by molten resin or other mechanism into a layer of gap-graded frit of larger particle size than the pigment.

The desired migration of frit, as opposed to pigment, between layers is optionally achieved by being carried by molten matrix prior to its vapourisation in the heat treatment process. A molten matrix of resin and plasticiser of suitable rheology, will migrate into the voids of an adjacent layer by surface tension or capillary action, in the same manner that water is absorbed into blotting paper. For example, a glass panel with a frit-loaded print pattern and a covering layer of non-frit ink is preferably arranged to have a resin matrix of lower melting and vapourisation temperatures in the covering layer than in the print pattern layer. The matrix in the covering layer is thus vapourised before the matrix in the print pattern layer, which migrates with frit into the upper layer before itself being vapourised. This migration is typically assisted by the partial vacuum caused by vapourisation of the matrix in the upper layer.

The migration of frit within a molten matrix can be further enabled by introducing an expanding agent into the ink matrix, to force the molten, frit-loaded matrix into the voids of one or more other layers in which the matrix has a lower melting and vapourising temperature or has otherwise first been "burnt off".

Therefore, the grading or particle distribution curve of both pigments and frit and the resin matrix characteristics can be selected in the different layers to optimise the method and, in particular, the redistribution of frit from the print pattern layer to the other layer or layers.

In ceramic ink, there is typically of the order of ten parts of frit to one part of pigment. To increase this ratio to provide a "frit-loaded" ink would tend to reduce the strength of any perceived colour. While there may be advantages in having coloured ceramic ink print patterns which are frit-loaded, for example to contain additional titanium dioxide white pigment, to be seen in conjunction with another white ink layer, to enhance the overall opacity of white, it is typically advantageous with the present method for the frit-loaded print pattern layer to be clear or colourless, sometimes referred to as "water clear". Thus the provision of colours can be concentrated in the other layers for better colour intensity and colour control. In the case of an intermediate print pattern, clear frit-loaded ink has the potential additional benefit of providing a separation layer between colours, for example the white and black layers of a simple vision control panel comprising white dots superimposed on black dots, or vice-versa. There is a problem with prior art panels comprising superimposed layers of white and black ceramic ink, in that through pigment transfer, cracking, pin holes or other defects, the colour on the other side can sometimes be seen from the side being viewed. An intermediate clear ink layer tends to minimise any such migration of pigment from one layer to the other.

The method of the invention can be combined with prior art methods, for example the printing of a print pattern of one colour and dusting this with the pigment of another colour disclosed in GB 2 118 096 (Hill) and GB 2 165 292 (Hill), to form a vision control panel. For example, a design can first be printed and cured onto a sheet of glass or decal carrier, followed by a print pattern of frit-loaded white ceramic ink, which when still wet may be dusted with black pigment, for example black iron oxide, and then cured. When a glass sheet with these layers is fired, frit in the white ink layer binds the design and the black pigment to the glass sheet, to form a vision control panel.

To assist the migration of glass frit, the particle size distribution of the constituent materials is important, for example, glass frit ground to less than 3 micron maximum size can migrate into a gap graded pigment layer of say 8-10 micron particle size.

As well as one-way vision control panels, typically having a print pattern of dots or lines, the method can be used to make a variety of other products in which substantially exact registration is desired. For example, it is known that the colours of a design are typically required to be seen on a white background. The method enables a coloured design, for example an architectural sign "no exit" in red indicia on a glass door, to be printed with a white layer exactly underlying each red letter character, the perimeter of each layer being in substantially exact alignment, by either the red or white layer being frit-loaded and the other layer being frit-free.

As another example, the method may also be used to register single layers of different colours laterally. For example, a decorative architectural glass partition panel may comprise alternate red and grey lines. Conventional prior art methods of printing inevitably suffer from lack of registration. Typically, the two sets of coloured lines, applied using two different screen printing screens, would suffer from different spacing between the lines in different parts of a single panel and in different panels in such a production run. By printing a clear glass frit print pattern of all the lines in a single layer, either under or over the other colours and the other colours overlapping the clear glass frit lines, the required line colours, thickness and spacing can be achieved throughout a single panel and for all panels of a production run.

FIGS. 1A-8F are diagrammatic cross-sections through a panel of glass illustrating the sequential stages of different variants of this method to produce glass panels having superimposed layers of ink with substantially exact registration, in which the glass is directly printed.

FIGS. 26A-F are diagrammatic cross-sections through a glass panel illustrating sequential stages of printing a sign with coloured letter characters and exactly superimposed on a white layer. FIG. 26G is an elevational view of such a sign.

Figure 27A:
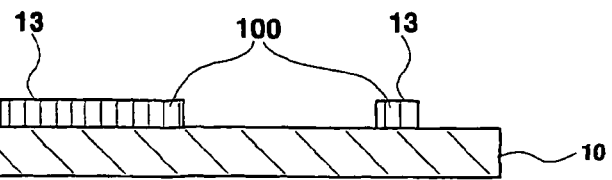
Figure 27B:
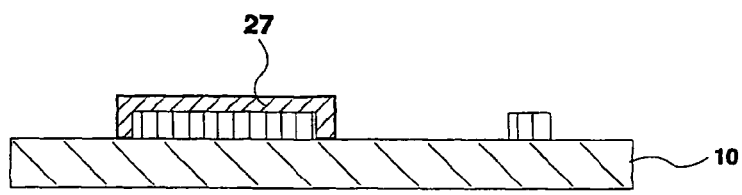
Figure 27C:
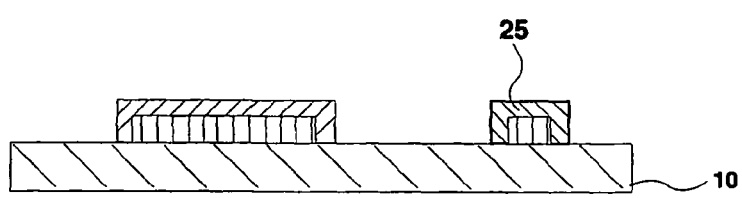
Figure 27D:
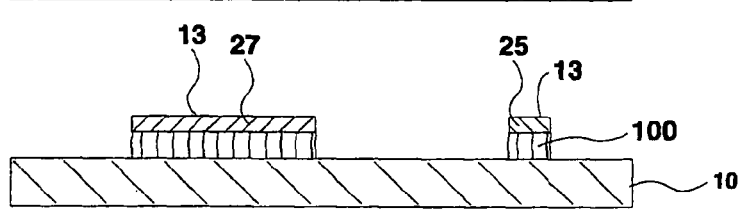
Figure 27E:
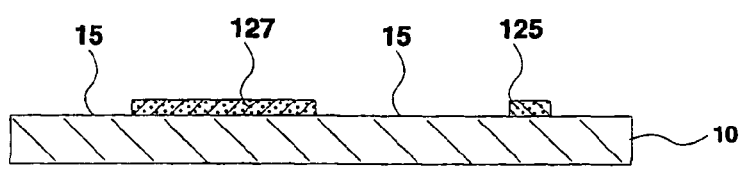
Figure 27F:
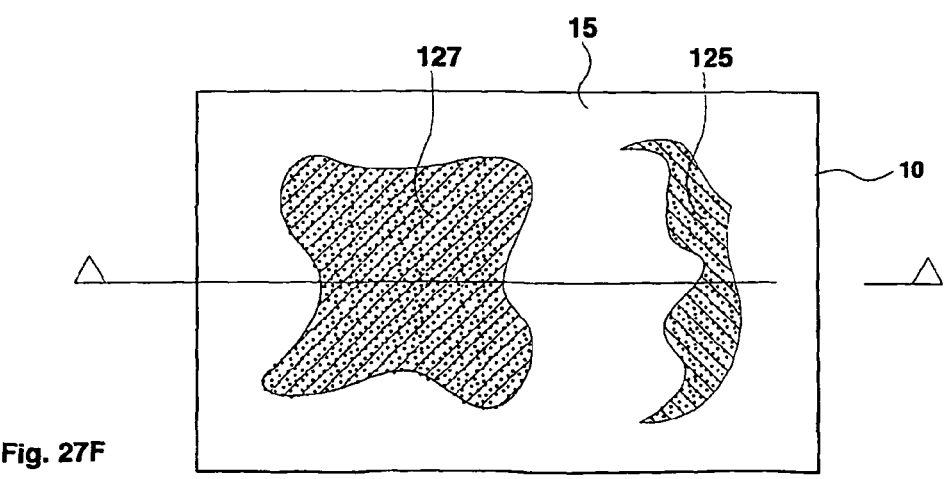

FIGS. 27A-E are diagrammatic cross-sections through a glass panel illustrating sequential stages of printing differently coloured, single layer areas of ink that are registered laterally. FIG. 27F is a plan of such a panel.

FIG. 1A illustrates glass panel 10, typically of normal, annealed glass. In FIG. 1B coloured down print pattern layer 14 is applied to glass panel 10 leaving unprinted portions 15 in between the printed areas of print pattern 13. Layer 14 typically comprises a screenprinted ceramic ink comprising glass frit. For example, to make a simple vision control panel, the print pattern is typically a pattern of dots, lines or other geometric shape in a regular layout and layer 14 is typically black to enable good through vision. In FIG. 1C, layer 14 in print pattern 13 is overlain with a layer 20, typically of ink similar to ceramic ink but without any glass frit and typically also screen-printed. In a simple vision control panel, layer 20 is typically white or other light colour. In FIG. 1D, the printed panel has been subjected to a heat treatment process, typically by being placed in a furnace and subjected to a temperature regime which causes the ink medium or matrix to be burnt off leaving pigment dust (not shown) in the areas 15 outside the print pattern. In FIG. 1E, the heat treatment process also causes the glass frit to melt and fuse to glass panel 10. Some of the molten frit migrates into layer 20 amending its composition to become layer 120, layer 14 also being amended by the reduction in glass frit to become layer 114. If necessary, the unwanted pigment dust can be removed by vacuum suction, air jet or water jet.

There is sufficient glass frit in layer 14 to bind all or a proportion of layer 20 amended to 120 to layer 14 amended to 114. The layers 120 and 114 are left in substantially exact registration, in the form of the print pattern. Layer 14 containing the glass frit is therefore effective as a control layer to determine the ultimate pattern remaining on the glass surface. If, for example, layer 114 comprises black ceramic ink and layer 120 comprises white ceramic ink and the print pattern comprises a regular pattern of dots, the resultant panel forms a typical one-way vision panel of uniform appearance from either side, white from on one side and black from the other side. The black dots 114 enable good through vision through the panel from the side facing the black ink whereas the white ink 120 reflects incident light, tending to obscure vision through the unprinted areas 15.

Figure 2A:
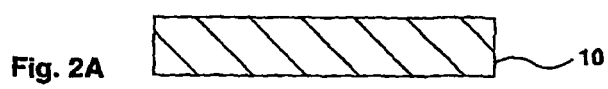
Figure 2B:
Figure 2C:
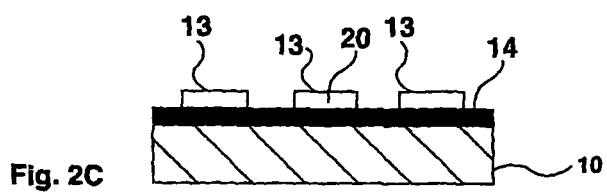
Figure 2D:
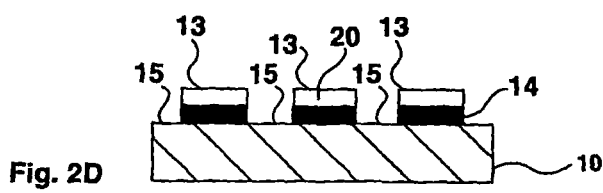
Figure 2E:
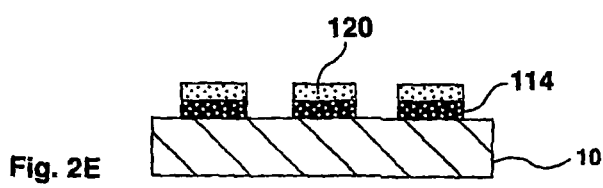

FIGS. 2A-E illustrate an alternative method of the invention to create a similar product. In FIG. 2B the glass panel 10 of FIG. 2A is coated with layer 14, typically similar to ceramic ink but without the glass frit component of ceramic ink. In FIG. 2C second layer 20 is applied in the form of top print pattern 13, typically being ceramic ink including glass frit. In FIG. 2D, the printed panel of FIG. 2C has been subjected to a heat treatment which causes the glass frit in layer 20 to melt and part of the glass frit to migrate through first layer 14 and fuse with glass panel 10. Portions of first layer 14 not within print pattern 13 are burnt off in the heat treatment furnace and/or removed by a subsequent finishing process. In FIG. 2E, layer 20 amended by reduced frit to form layer 120 and layer 14 amended by added frit to form layer 114 are superimposed with substantially exact registration in the form of print pattern 13 to leave unprinted portions 15.

Figure 3A:
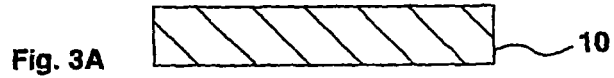
Figure 3B:
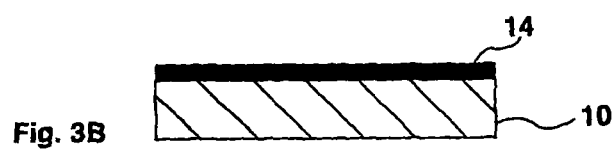
Figure 3C:
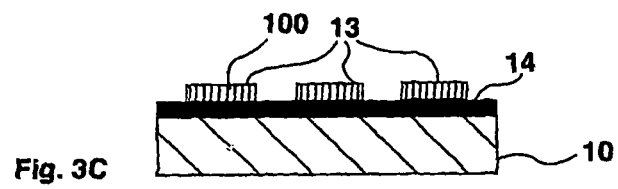
Figure 3D:
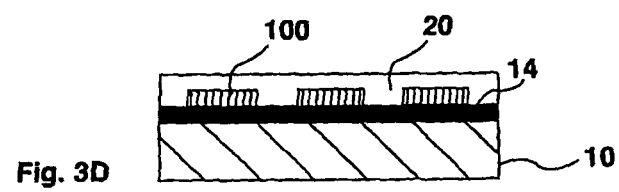
Figure 3E:
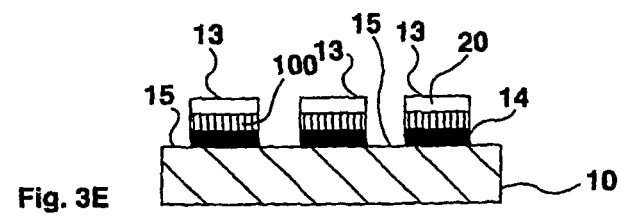
Figure 3F:
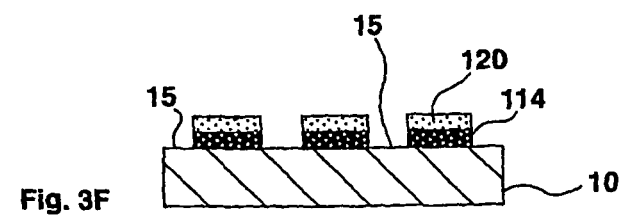

FIGS. 3A-F illustrate another variant of the invention to produce a panel of similar appearance to those of FIGS. 1E and 2E. However, in this method, in which the glass panel 10 of FIG. 3A is coated with first layer 14 in FIG. 3B, intermediate print pattern layer 100 is applied in FIG. 3C. Layer 100 typically comprises water clear ceramic ink which is screen printed to form print pattern 13. However, print pattern layer 100 can be of any colour, for example in the manufacture of a panel with white on black dots, layer 100 can be white in order to achieve a white dot of greater perceived opacity in conjunction with a subsequent white layer 20. In FIG. 3D, print pattern layer 20 is applied over layer 100 and the exposed portions of layer 14, and typically comprises ink similar to ceramic ink but without any glass frit. In FIG. 3E, a heat treatment regime causes the glass frit in layer 100 to melt and migrate through layer 14 and fuse to glass panel 10 and also bond all or a proportion of the thickness of layer 20 to layer 100. In FIG. 3F, layers 20 and 14 are amended by added frit to form layers 120 and 114, which are superimposed in substantially exact registration in print pattern 13, appearing of uniform colour from each side, for example white dots from one side and black dots from the other side.

Figure 4A:
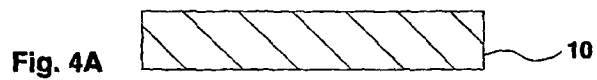
Figure 4B:
Figure 4C:
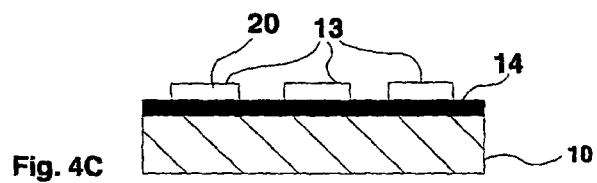
Figure 4D:
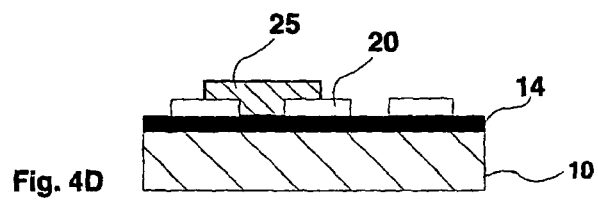
Figure 4E:
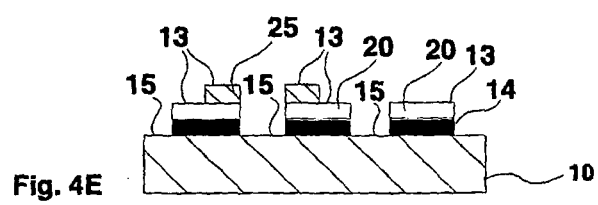
Figure 4F:
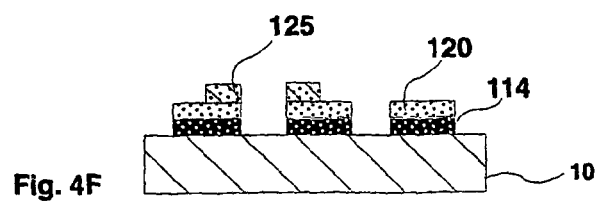

FIGS. 4A-C are similar to FIGS. 2A-C, layer 14 typically being black and layer 20 typically being white. Design layer 25 is selectively applied to the panel, design layer 25 typically being a colour different to layer 20 and typically being fritless ceramic ink. FIG. 4E illustrates the panel of FIG. 4D undergoing a heat treatment regime in which the frit in layer 20 has melted and migrated through layer 14 to fuse to glass panel 10 and has bound all or part of the thickness of design layer 25 to layer 20. Layers 14 and 25 outside the area of print pattern 13 have been burnt off with the exception of pigment powder, not shown. The resultant panel in FIG. 4F has amended layers 125 and 114 with added frit and amended layer 120 with reduced frit. The panel of FIG. 4F is a one-way vision, see-through graphics panel according to GB 2 165 292 in which design 125 is visible from one side of the panel and good through vision is provided from the other side of the panel. Typically layers 114 and 120 are black and white respectively in the form of an opaque print pattern 13 of dots, lines or other regular geometric elements or irregular elements, for example a stochastic print pattern.

Figure 5A:
Figure 5B:
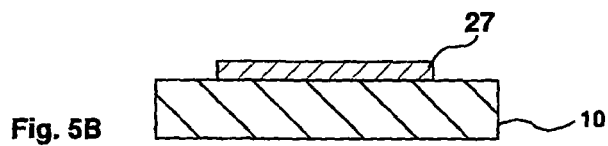
Figure 5C:
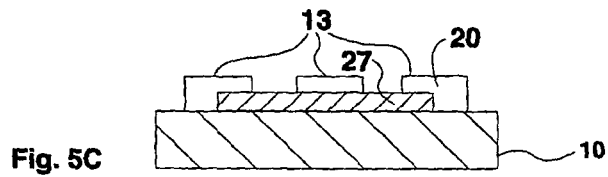
Figure 5D:
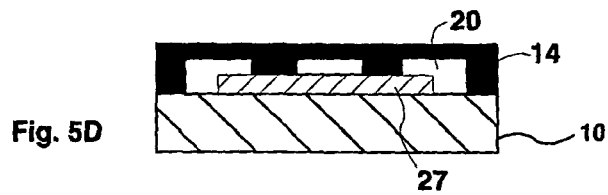
Figure 5E:
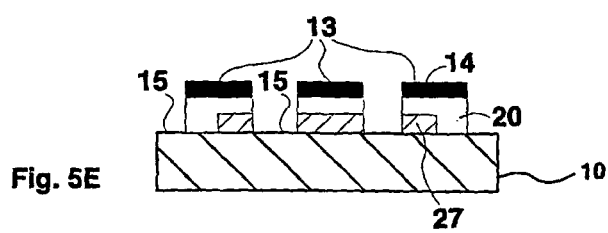
Figure 5F:
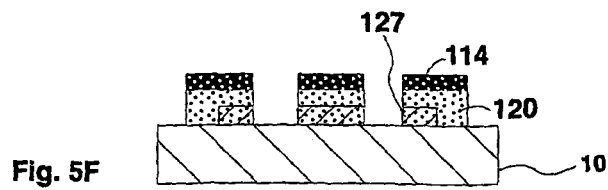

The method of FIG. 5A-E is similar to that of FIG. 4A-F, except that design layer 27 is first printed against glass panel 10 as illustrated in FIG. 5B, layer 27 typically being screen printed fritless ceramic ink. In FIG. 5C, layer 20 forms print pattern 13 and is typically white screen printed ceramic ink with frit. This is overlain by layer 14 in FIG. 5D, typically black fritless ceramic ink. FIGS. 5E and 5F illustrate similar processes to FIGS. 4E and 4F. In FIG. 5F, if amended layer 120 is white and amended layer 114 is black, good through vision is obtained from the black side, whereas design 127 is visible through glass panel 10 from the other side.

Figure 6A:
Figure 6B:
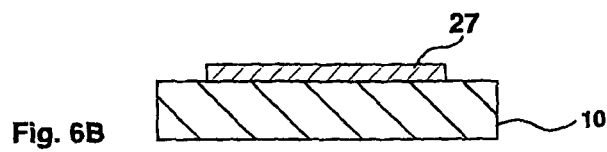
Figure 6C:
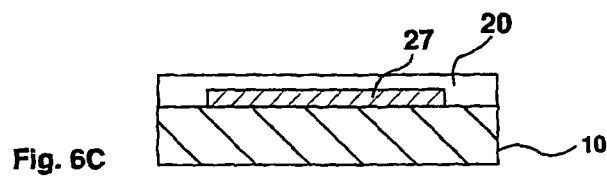
Figure 6D:
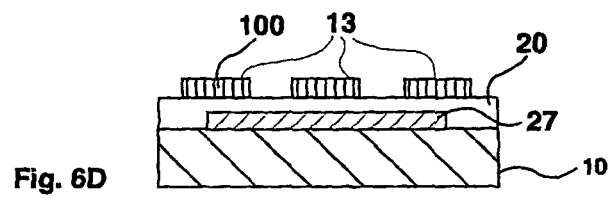
Figure 6E:
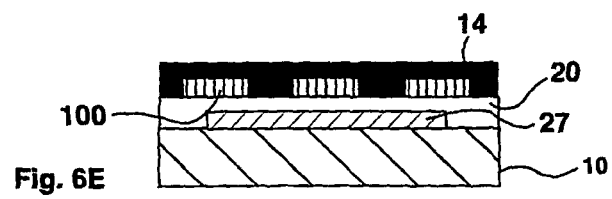
Figure 6F:
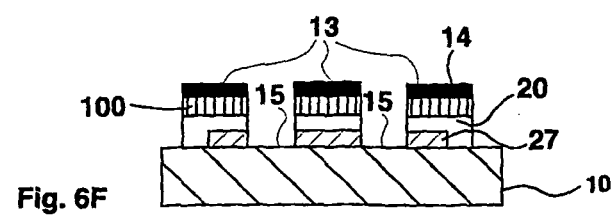
Figure 6G:
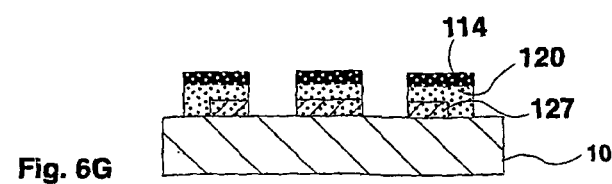

The method of FIG. 6A-G is similar to the previous method except that in FIG. 6D layer 100 forms print pattern 13, typically of frit-loaded ceramic ink, and the other layers, design layer 27 and background layers 20 and 14 all comprise fritless ceramic ink.

Figure 7A:
Figure 7B:
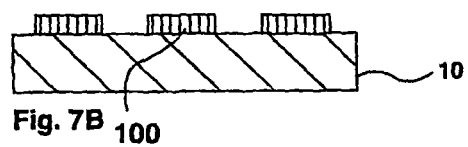
Figure 7G:
Figure 7C:
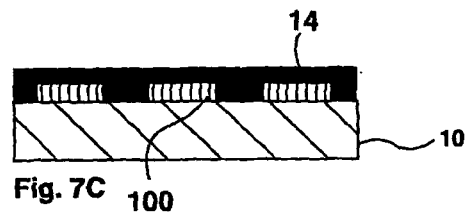
Figure 7H:
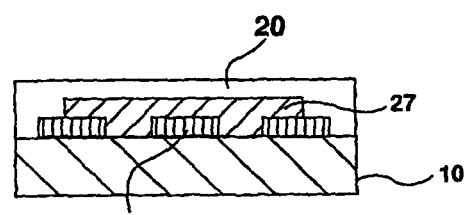
Figure 7D:
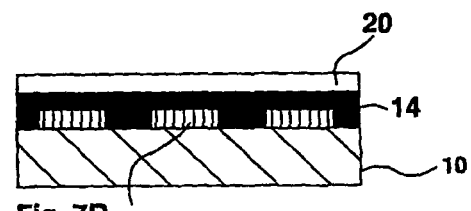
Figure 7I:
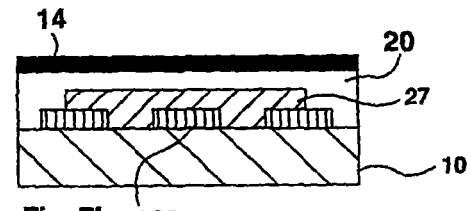
Figure 7E:
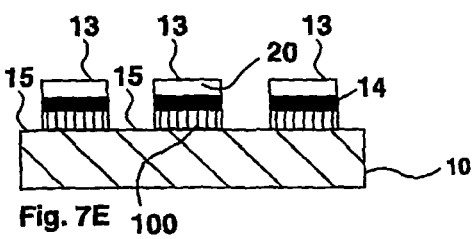
Figure 7J:
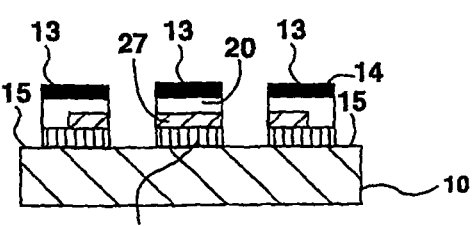
Figure 7F:
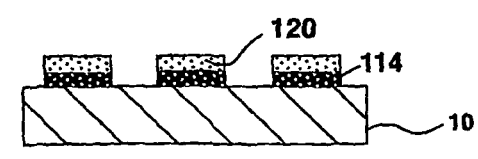
Figure 7K:
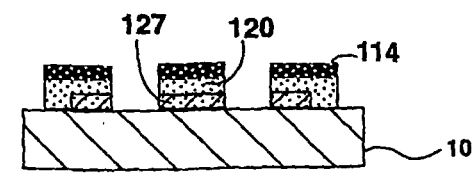

In the method of FIGS. 7A-K, the glass panel 10 of FIG. 7A is first provided in FIG. 7B with layer 100 in the form of print pattern 13, typically screen printed water clear ceramic ink that binds all subsequent layers of fritless ceramic ink. This arrangement has the benefit that glass panels can be printed in volume with a print pattern of clear ceramic ink 100 and converted subsequently into any arrangement of layers and designs facing to one or both sides, thus FIGS. 7C-F illustrate a sequence of layers to produce a panel which following heat treatment and any subsequent finishing process appears similar to panels of FIGS. 1E and 2E. Alternatively, FIGS. 7G-K illustrate a sequence of printing and treatment to provide amended design layer 127 visible through glass panel 10 and uniform layer 114, typically black, providing good vision through the completed panel from the other side, similar to FIGS. 5F and 6G. This method has the added benefit of enabling the clear "down print pattern" in FIG. 7B to be pre-fired, removing the resin and plasticiser matrix in this layer, before the application of the subsequent layers and further firing in which the glass frit 100 within print pattern 13 migrates to the other layers and/or the pigment in the other layers settles into the glass frit within print pattern 13, binding the other layers to panel 10. As a variant of this method, the "down print pattern" 100 is applied by ceramic decal. Panels of FIG. 7B can be regarded as "part processed panels" capable of being subsequently imaged in different ways, for example according to FIGS. 7C-F or FIGS. 7G-K.

Figure 8A:
Figure 8B:
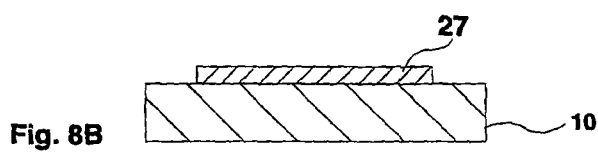
Figure 8C:
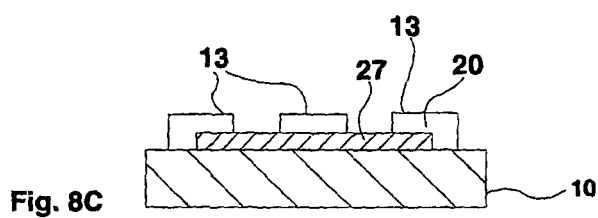
Figure 8D:
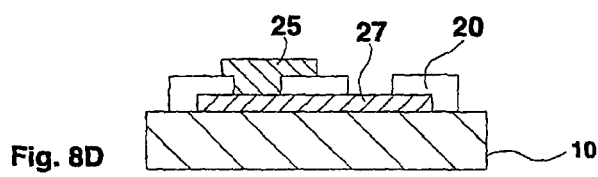
Figure 8E:
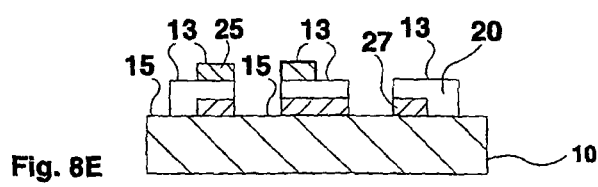
Figure 8F:
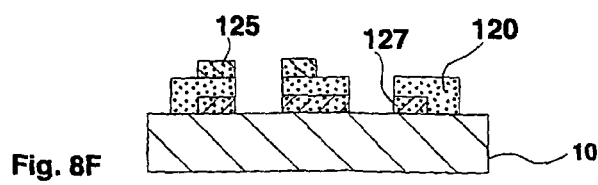
Figure 9A:
FIGS. 9A-16H are diagrammatic cross-sections through a decal carrier or glass panel illustrating sequential stages of different variants of this method to produce glass panels having superimposed layers of ink with substantially exact registration, using an indirectly applied decal.
Figure 9B:
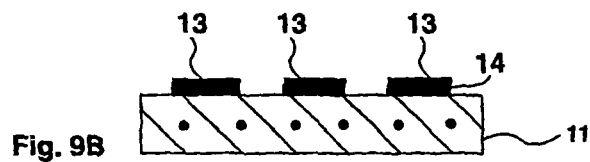
Figure 9C:
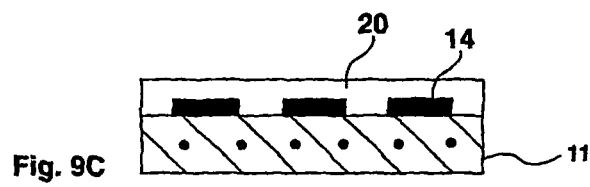
Figure 9D:
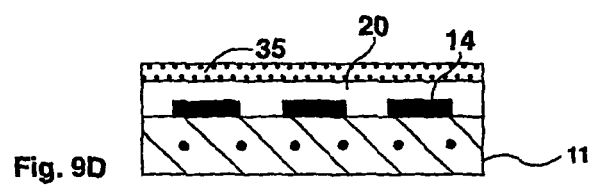
Figure 9E:
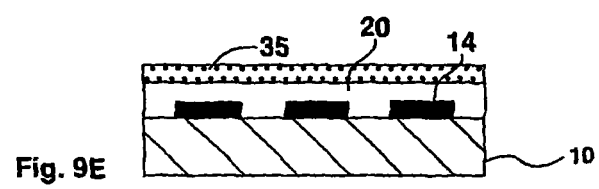
Figure 9F:
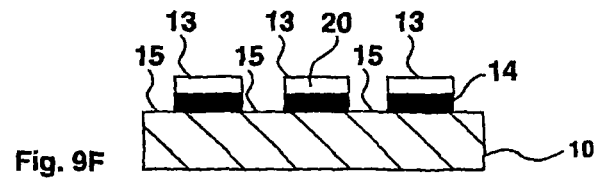
Figure 9G:
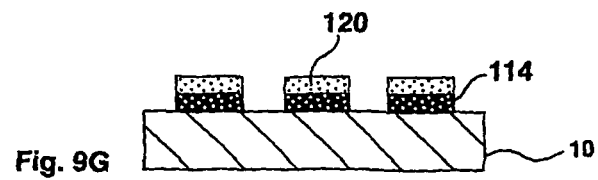
Figure 10A:
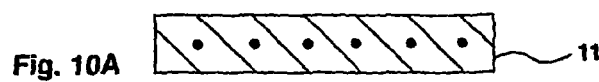
Figure 10B:
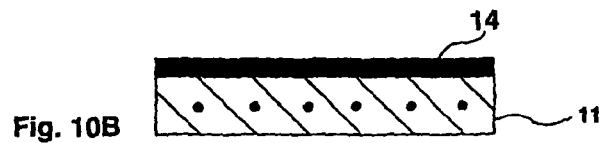
Figure 10C:
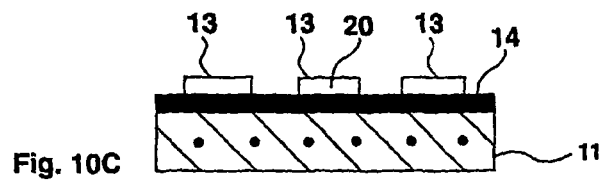
Figure 10D:
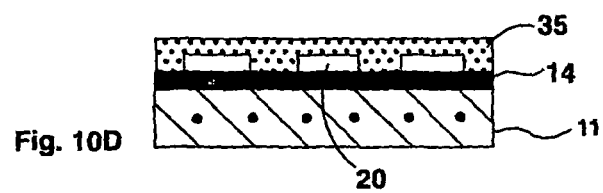
Figure 10E:
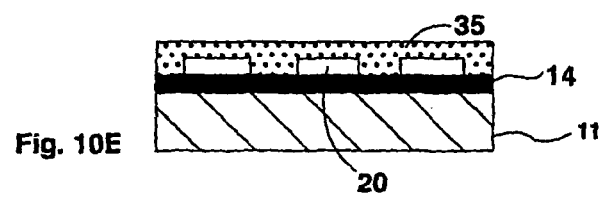
Figure 10F:
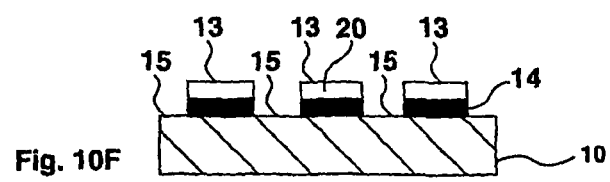
Figure 10G:
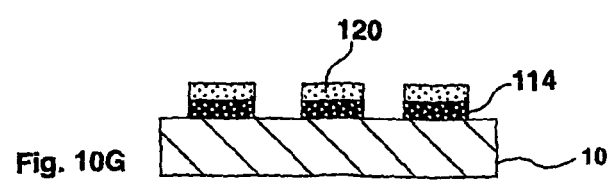
Figure 11A:
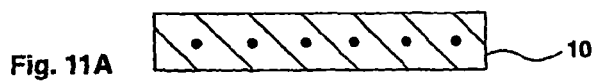
Figure 11B:
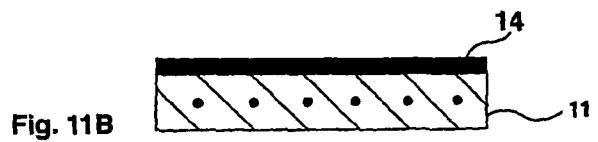
Figure 11C:
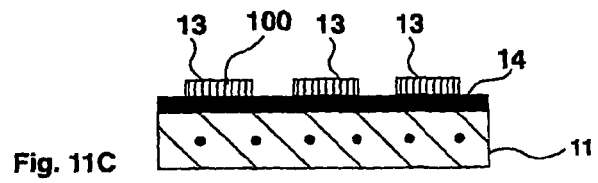
Figure 11D:
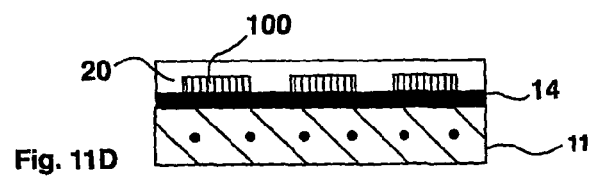
Figure 11E:
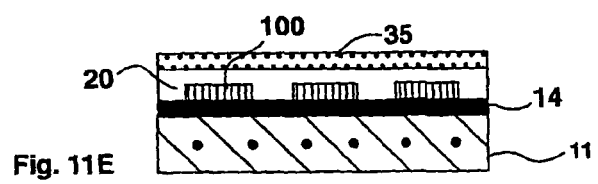
Figure 11F:
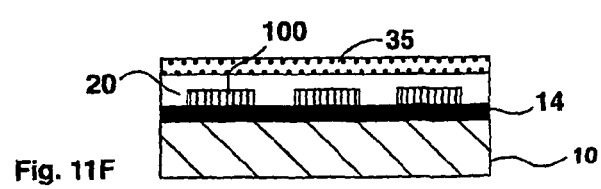
Figure 11G:
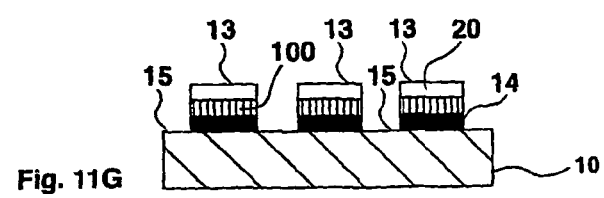
Figure 11H:
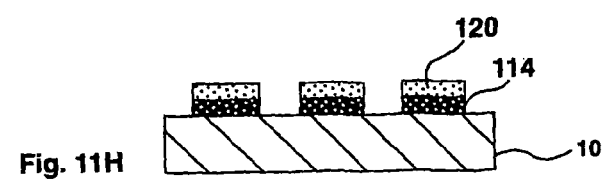

The sequence of FIGS. 8A-F follows similar stages to previous methods except that design layer 27 and design layer 25, both of fritless ceramic ink, are bound by ceramic ink layer 20 in the form of print pattern 13. In FIG. 8F, amended design layer 125 is visible from one side of the panel and not visible from the other side of the panel, whereas amended design layer 127 is visible from the other side of the panel and not from the first side.

FIGS. 9A-16H illustrate a different aspect of the invention, in which the layers of ink are first applied to indirect decal carrier 11 and then are transferred to glass panel 10 before the heat treatment process. Otherwise like numerals refer to like elements in this and the other figures prefixed 9-15 which illustrate methods corresponding to those in figures prefixed 1-8. Decal carrier 11 typically comprises a paper based material with coatings to enable printing and subsequent release of the desired decal and its application to a sheet of glass 10. For example a waterslide transfer will typically have a sealant coating and a water soluble adhesion coating and optionally a downcoat, for example a methyl methacrylate lacquer. Covercoat 35 is typically of butyl or methyl methacrylate.

FIGS. 17A-24I illustrate methods corresponding to those prefixed 1-8 and 9-16 but utilising a decal carrier 11 suitable for the direct application of a decal, for example in a direct ceramic ink heat release transfer system. Decal carrier 11 typically comprises paper, a sealant layer and a heat release layer, typically a polyethylene glycol (peg) wax. This is optionally printed with a covercoat, typically a film forming covercoat, for example of butyl or methyl methacrylate. Following the application of the other layers, which are described using like numerals for like elements in the previous figures, a heat-activated adhesive layer 29 is applied, for example a methacrylate resin. This transfer assembly is then typically positioned directly against the glass panel 10 with the adhesive layer against the surface of glass panel 10. Heat is applied via the paper, for example from a heated roller or plate which simultaneously activates the adhesive layer and the separate heat release agent. This enables the decal of the adhesive layer, the frit-loaded ceramic ink print pattern and the fritless ceramic ink layers and any covercoat to be adhered to the substrate and be transferred from the carrier, the carrier being released and removed from the decal and substrate. The transfer is typically assisted by the application of pressure, typically by means of nip rollers. The substrate may optionally be pre-heated.

Figure 12A:
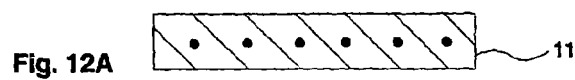
Figure 12B:
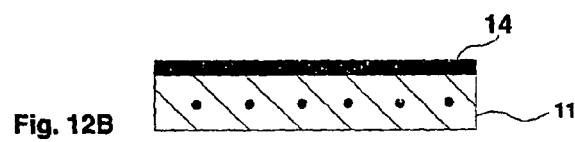
Figure 12C:
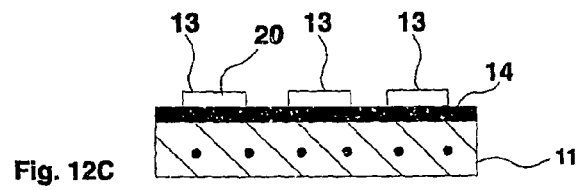
Figure 12D:
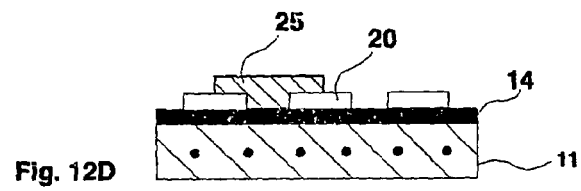
Figure 12E:
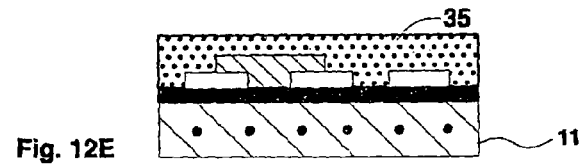
Figure 12F:
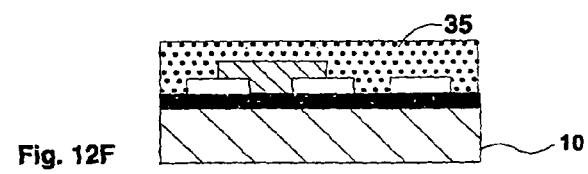
Figure 12G:
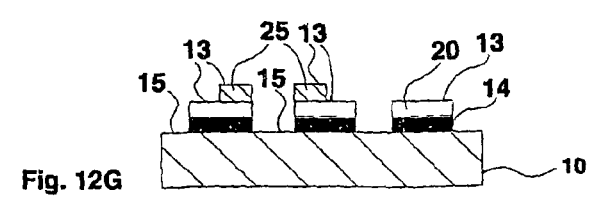
Figure 12H:
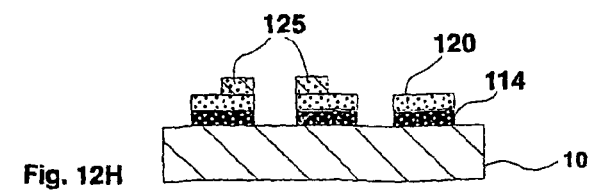
Figure 13A:
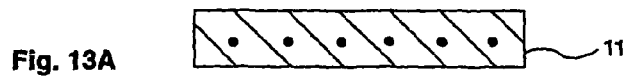
Figure 13B:
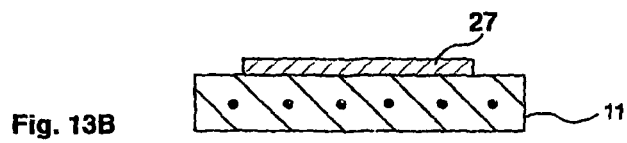
Figure 13C:
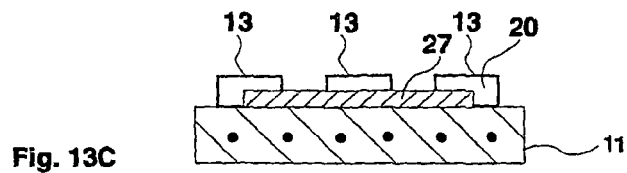
Figure 13D:
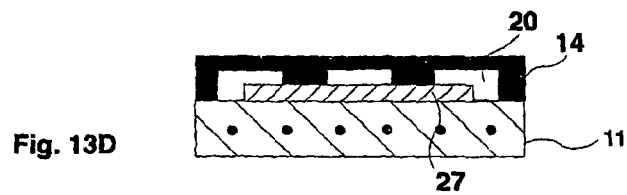
Figure 13E:
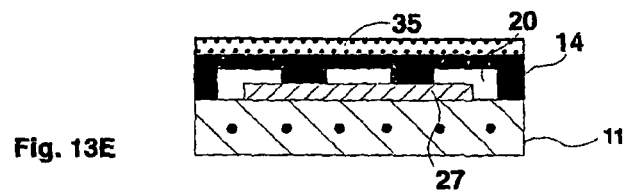
Figure 13F:
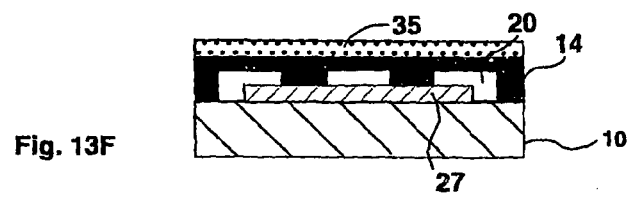
Figure 13G:
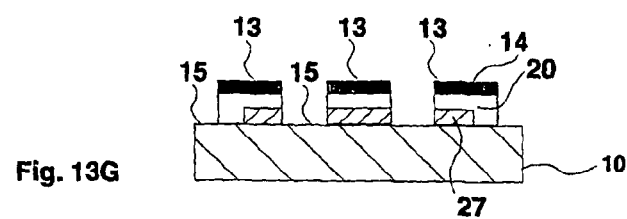
Figure 13H:
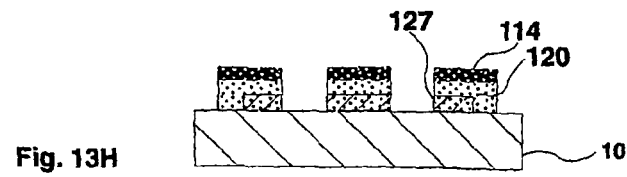
Figure 14A:
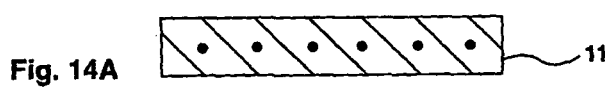
Figure 14B:
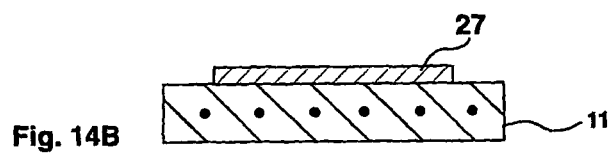
Figure 14C:
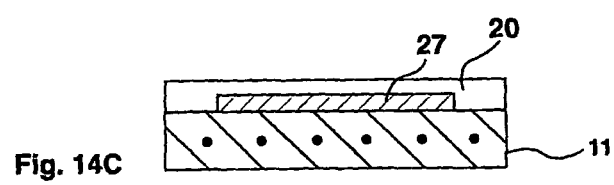
Figure 14D:
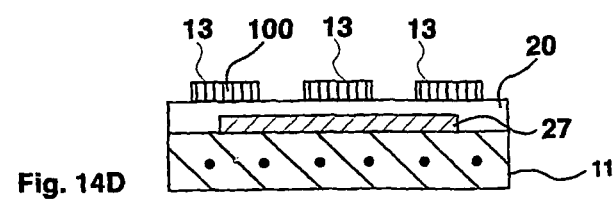
Figure 14E:
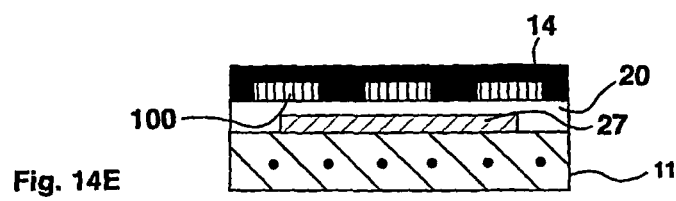
Figure 14F:
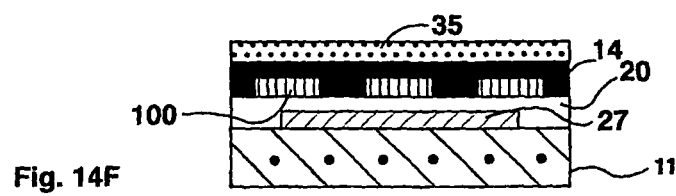
Figure 14G:
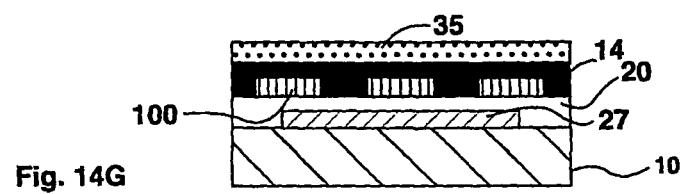
Figure 14H:
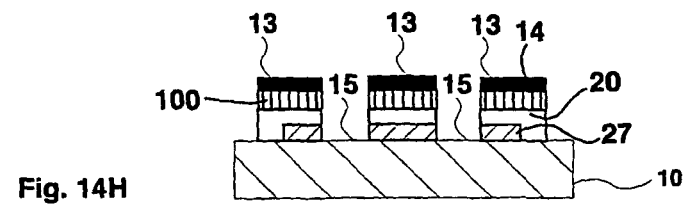
Figure 14I:
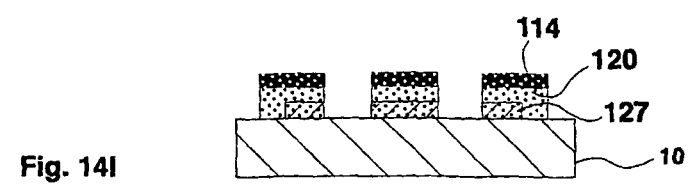
Figure 15A:
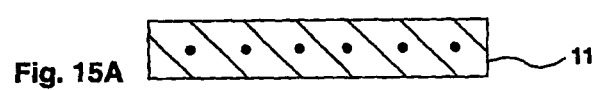
Figure 15B:
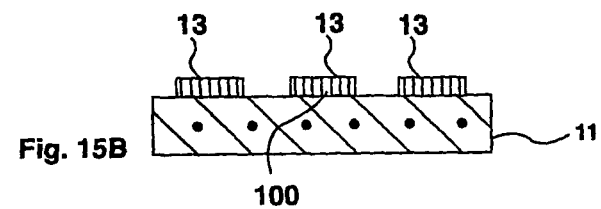
Figure 15C:
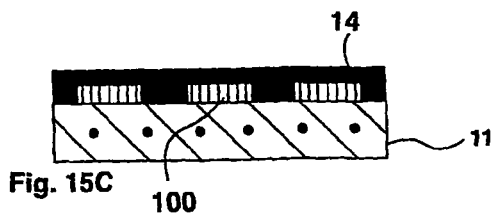
Figure 15I:
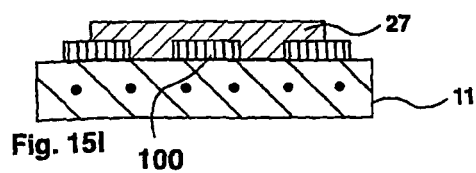
Figure 15D:
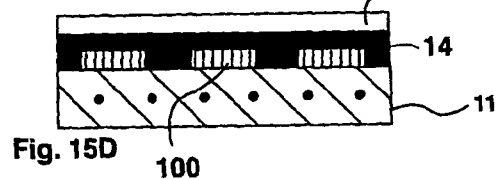
Figure 15J:
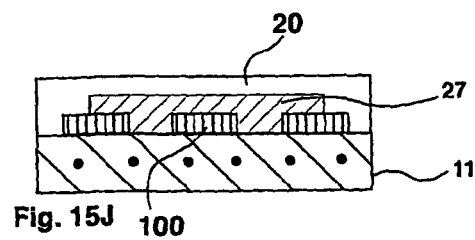
Figure 15E:
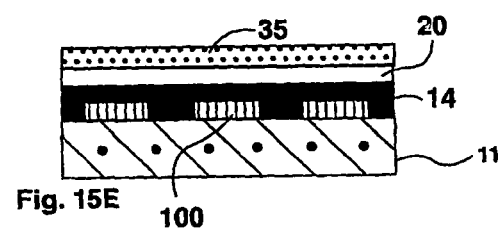
Figure 15K:
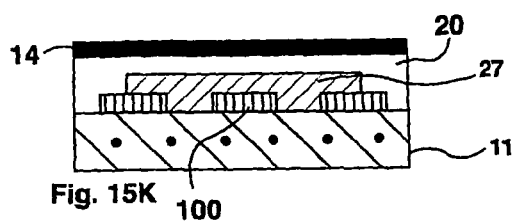
Figure 15F:
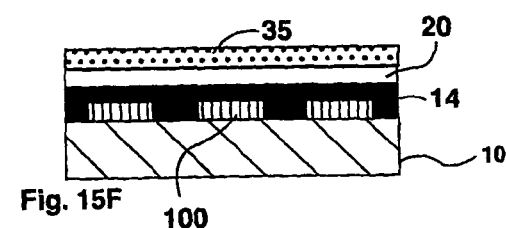
Figure 15L:
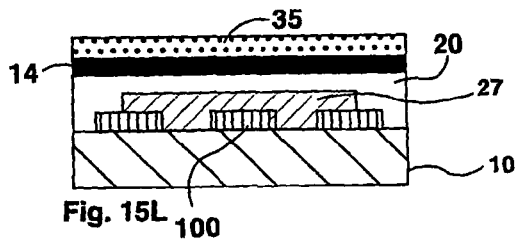
Figure 15G:
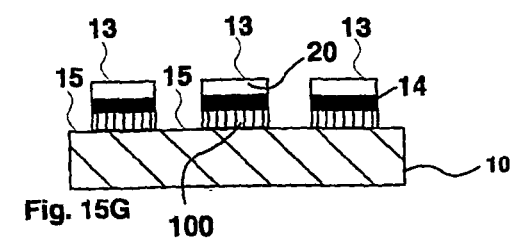
Figure 15M:
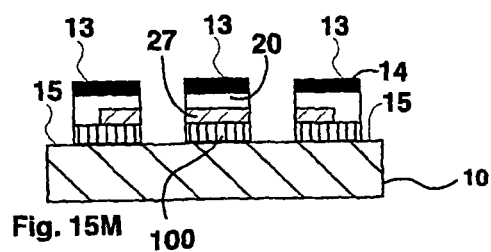
Figure 15H:
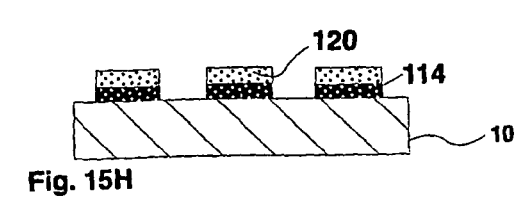
Figure 15N:
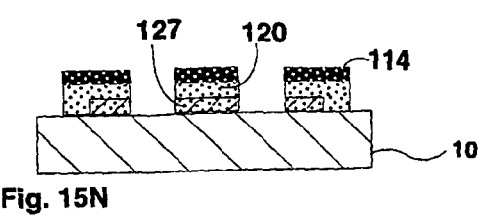
Figure 16A:
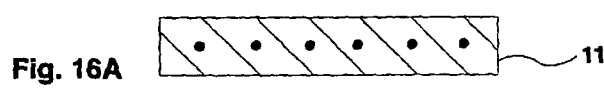
Figure 16B:
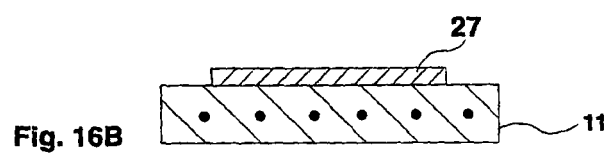
Figure 16C:
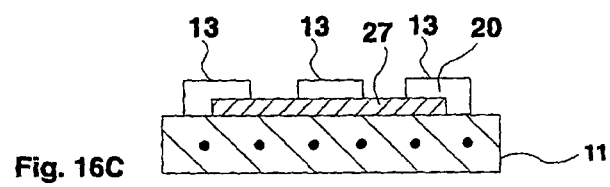
Figure 16D:
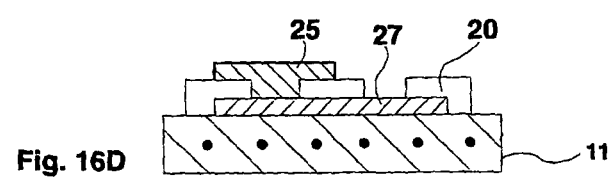
Figure 16E:
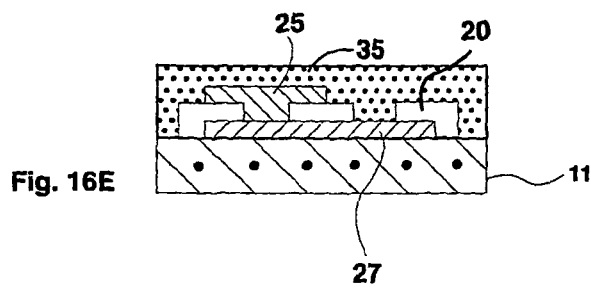
Figure 16F:
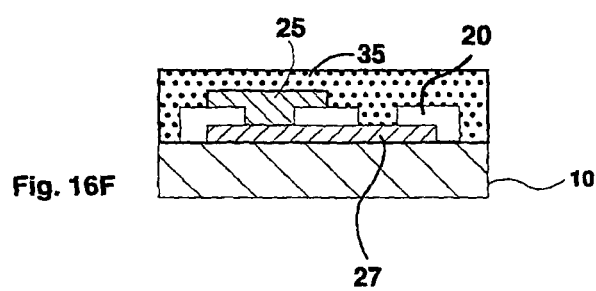
Figure 16G:
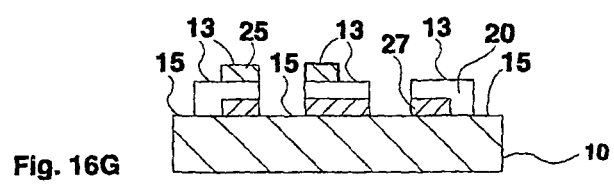
Figure 16H:
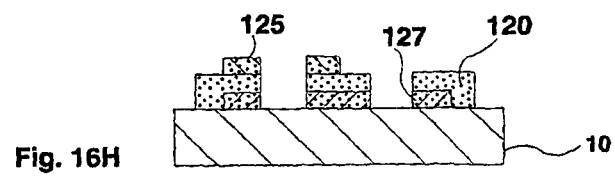
Figure 17A:
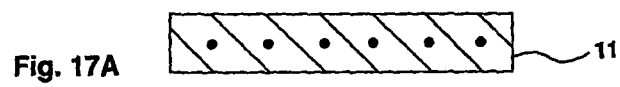
FIGS. 17A-24I are diagrammatic cross-sections through a decal carrier or glass panel illustrating sequential stages of different variants of this method to produce glass panels having superimposed layers of ink with substantially exact registration, using a directly applied decal.
Figure 17B:
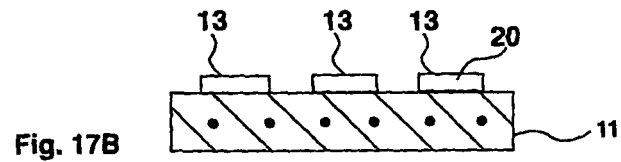
Figure 17C:
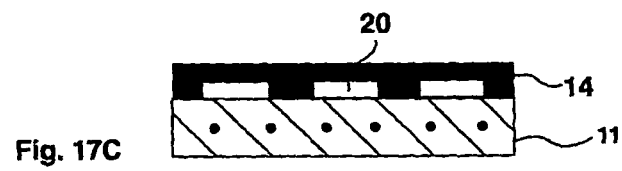
Figure 17D:
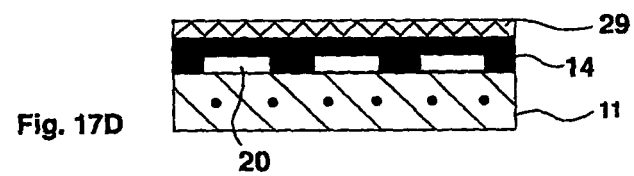
Figure 17E:
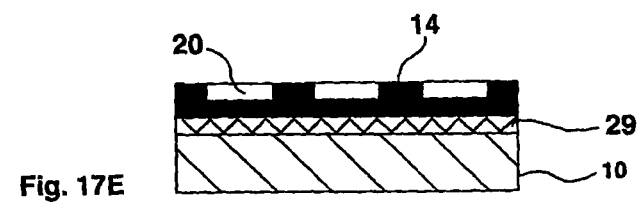
Figure 17F:
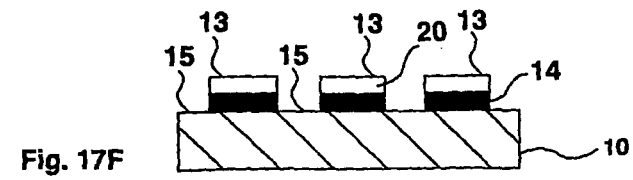
Figure 17G:
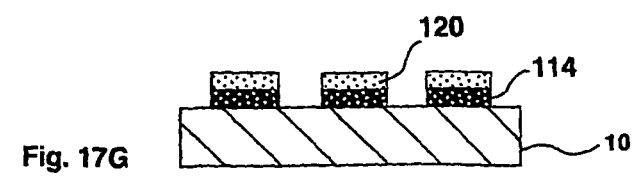
Figure 18A:
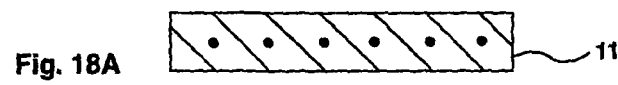
Figure 18B:
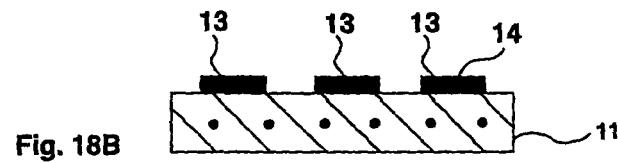
Figure 18C:
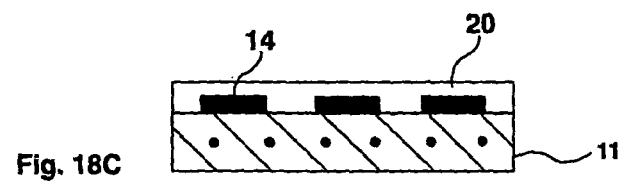
Figure 18D:
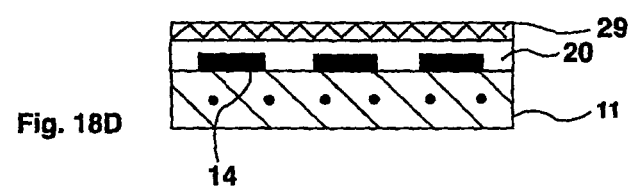
Figure 18E:
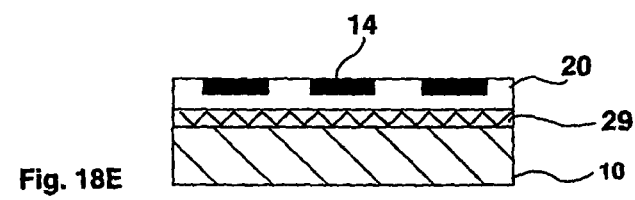
Figure 18F:
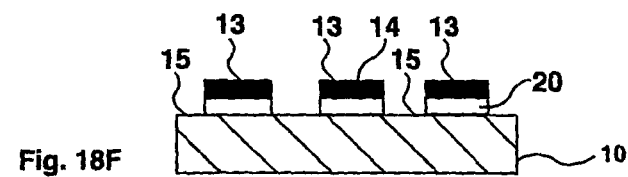
Figure 18G:
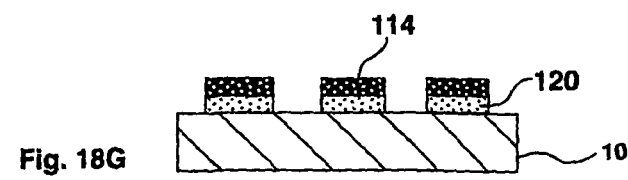
Figure 19A:
Figure 19B:
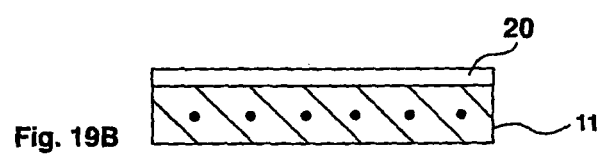
Figure 19C:
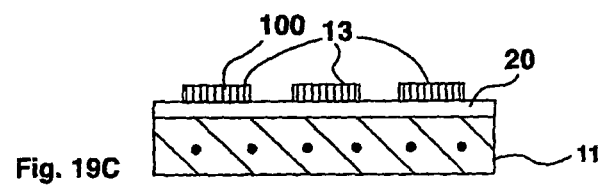
Figure 19D:
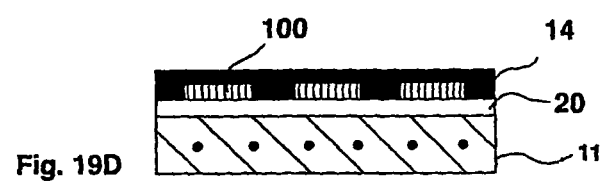
Figure 19E:
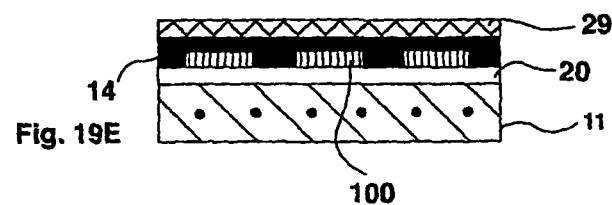
Figure 19F:
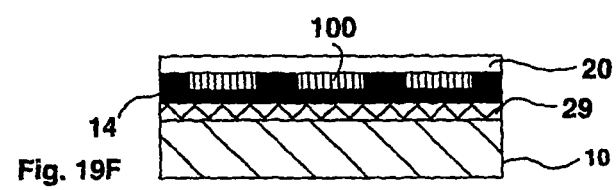
Figure 19G:
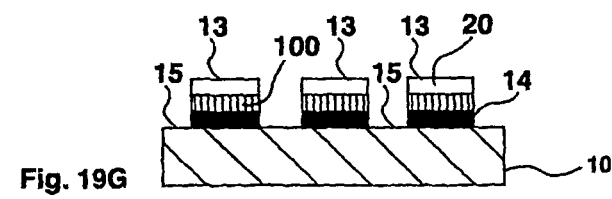
Figure 19H:
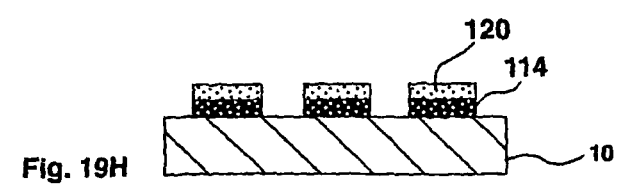
Figure 20A:
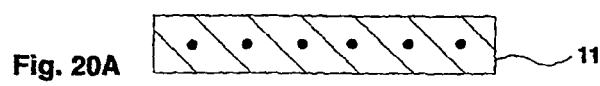
Figure 20B:
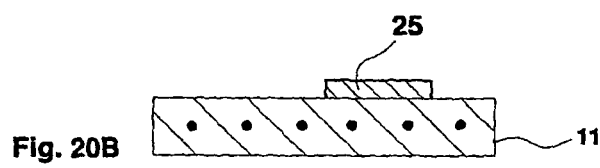
Figure 20C:
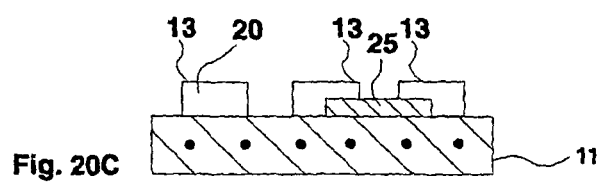
Figure 20D:
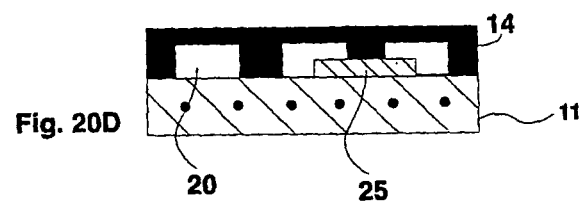
Figure 20E:
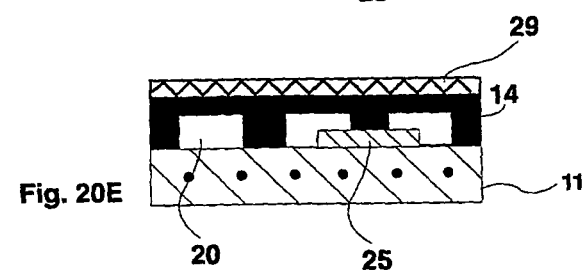
Figure 20F:
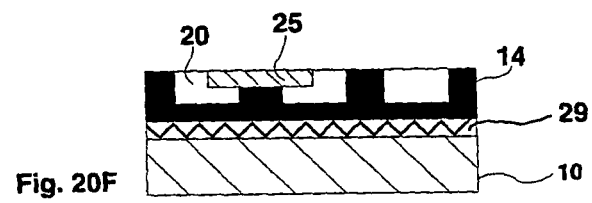
Figure 20G:
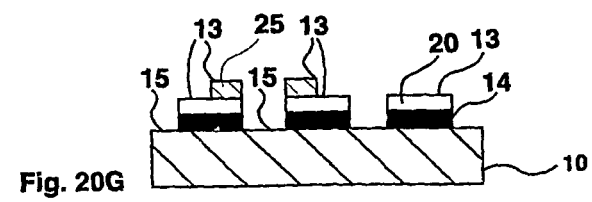
Figure 20H:
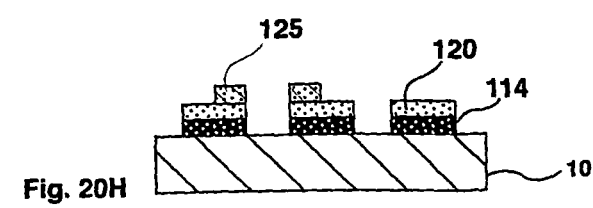
Figure 21A:
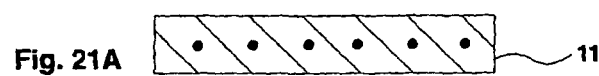
Figure 21B:
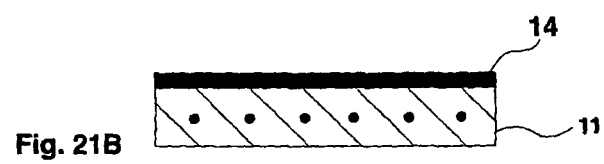
Figure 21C:
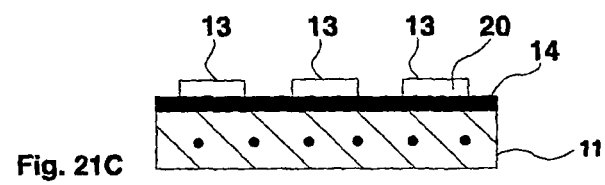
Figure 21D:
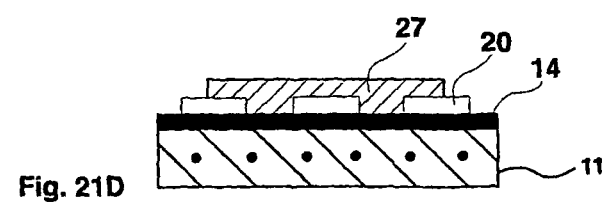
Figure 21E:
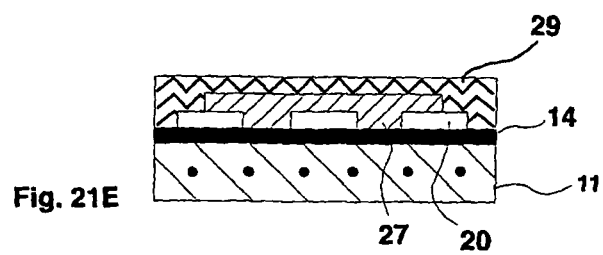
Figure 21F:
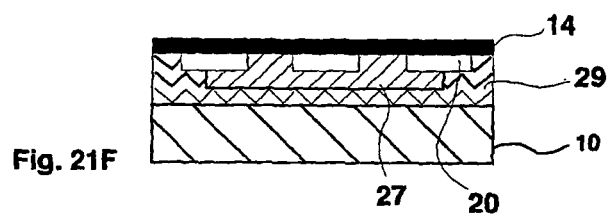
Figure 21G:
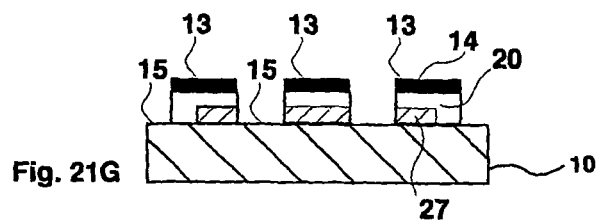
Figure 21H:
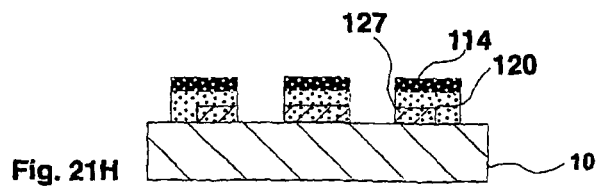
Figure 22A:
Figure 22B:
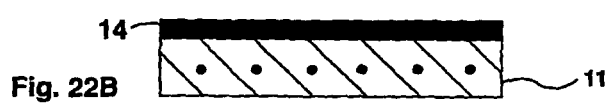
Figure 22C:
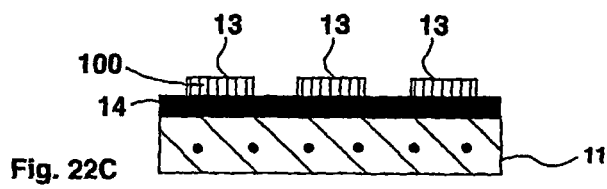
Figure 22D:
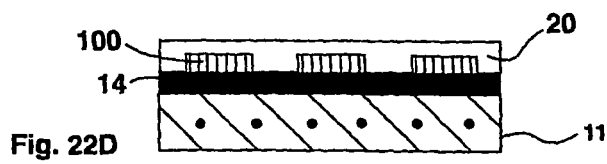
Figure 22E:
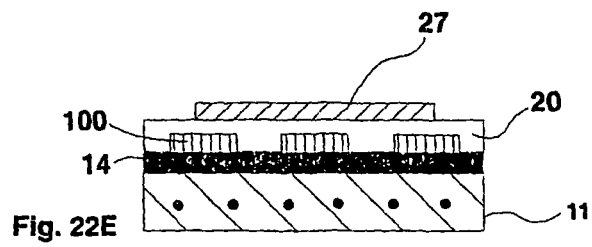
Figure 22F:
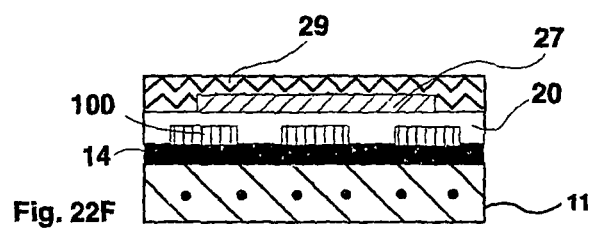
Figure 22G:
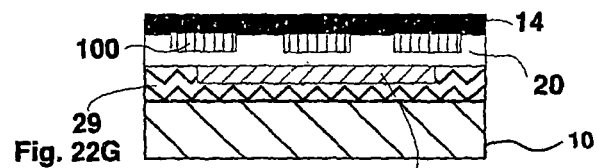
Figure 22H:
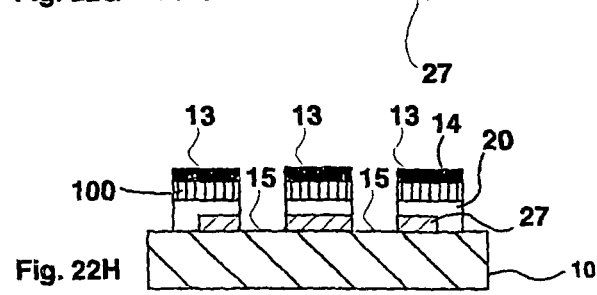
Figure 22I:
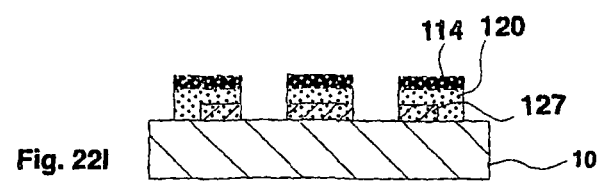
Figure 23A:
Figure 23B:
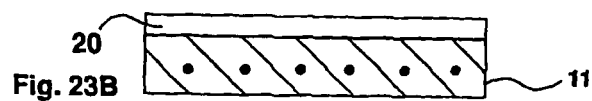
Figure 23C:
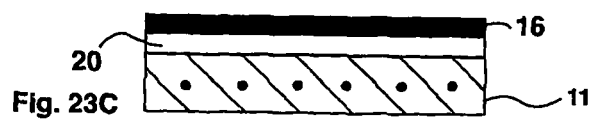
Figure 23D:
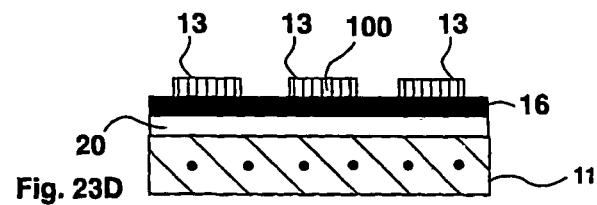
Figure 23E:
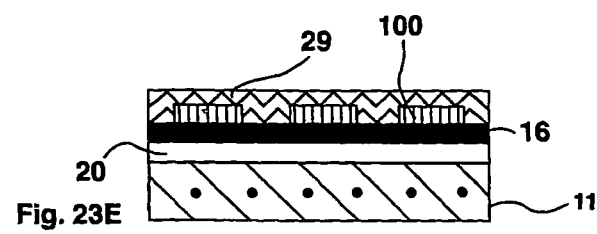
Figure 23F:
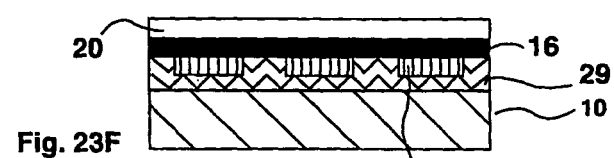
Figure 23G:
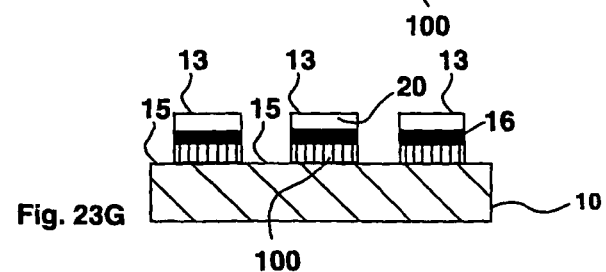
Figure 23H:
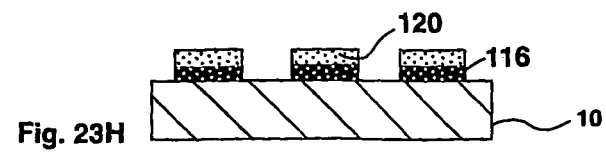
Figure 24A:
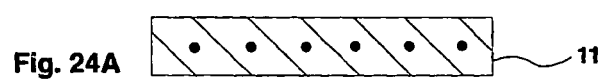
Figure 24B:
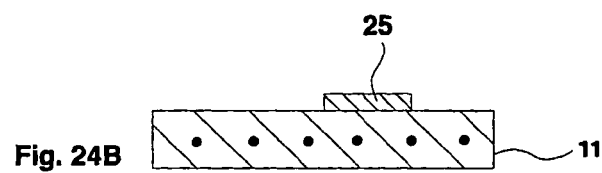
Figure 24C:
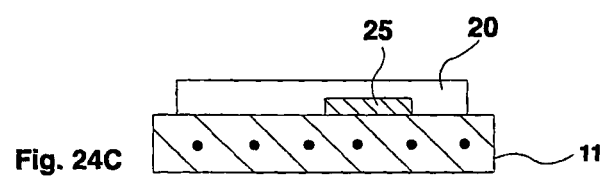
Figure 24D:
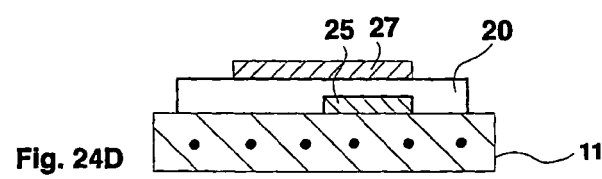
Figure 24E:
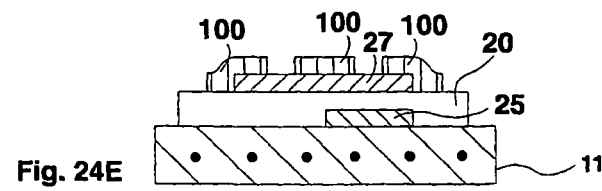
Figure 24F:
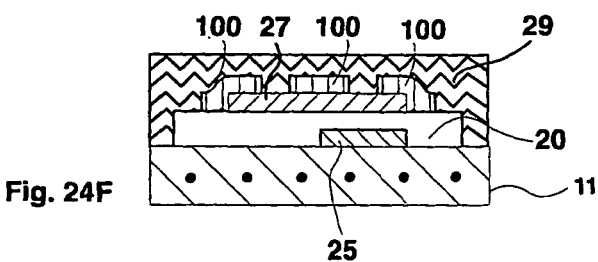
Figure 24G:
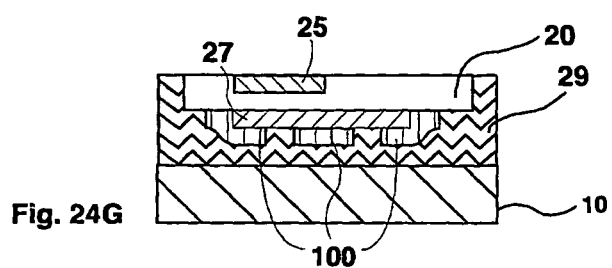
Figure 24H:
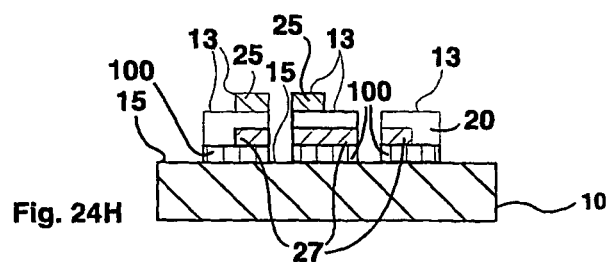
Figure 24I:
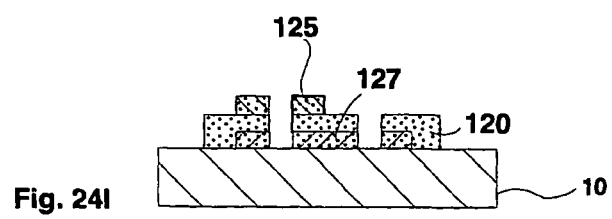
Figure 25A:
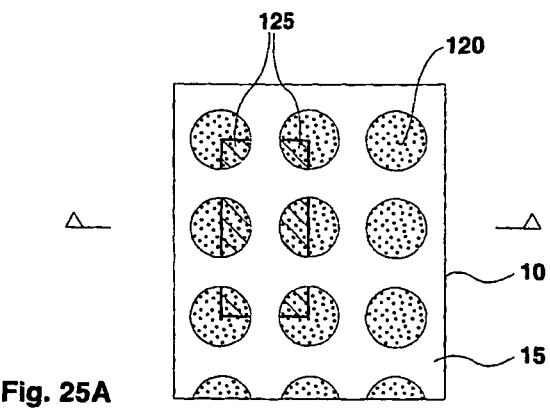
FIGS. 25A and 25B are diagrammatic elevations of a glass panel, with superimposed layers of ceramic ink in a dot pattern.
Figure 25B:
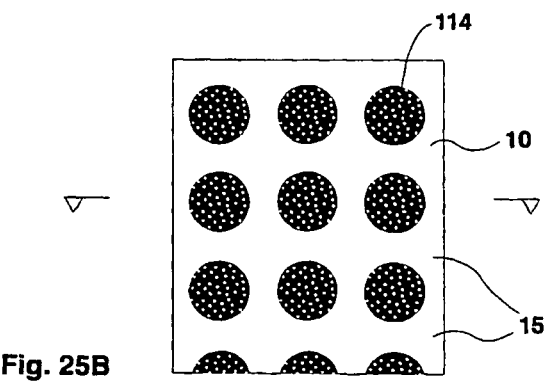
Figure 26A:
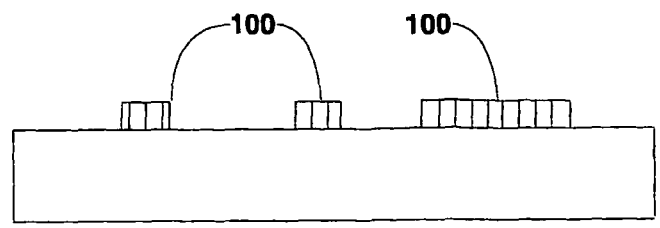
Figure 26B:
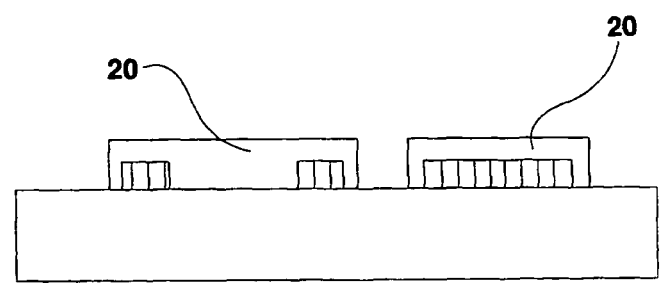
Figure 26C:
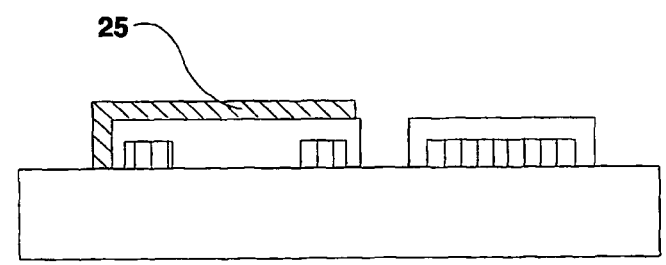
Figure 26D:
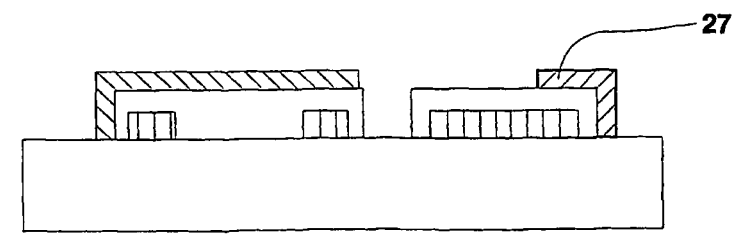

FIGS. 25A and 25B represent views of both sides of the panels illustrated in the cross-sections of FIGS. 4F, 12H and 20H. Design 125 is seen from one side of the panel as illustrated in FIG. 25A and a uniform layer of typically black dots or lines is seen from the other side of the panel in FIG. 25B, providing good through vision in a vision control panel.

FIGS. 26A-G illustrate a method of producing a coloured sign on a glass panel 10 with a white layer underlying the desired design colours with substantially exact registration, using like numerals for like elements in the previous figures.

FIGS. 27A-F illustrate a method of printing differently coloured discrete elements on a glass panel 10 which are in substantially exact lateral registration, one to the other, using like numerals for like elements.

The previously described methods can be intermixed, for example a glass frit down print pattern could be first applied to a sheet of glass by direct screen printing, to be followed by the following layers in the form of a decal. Alternatively, a glass frit down print pattern can be first applied by decal followed by the other layer or layers by direct print or a separate decal.

A furnace heat treatment may be applied at any stage in any of the methods after the application of the frit-loaded print pattern. The heat treatment to fuse the desired print pattern typically involves heating the panel up to approximately 570° C. Following removal from the furnace, the panel is typically passed below a vacuum knife or subjected to high pressure water jetting, to remove the unwanted pigment particles from areas 15.

The method may be used to make panels according to EP 088 0439A (Hill) comprising a glass panel imaged with a translucent print pattern, typically white, having a design visible from one side of the panel which may be illuminated from the other side of the panel.

A cross-section through any of the glass panels made by the method comprises alternate printed portions and unprinted portions.

The method has great advantage over the prior art method of first printing a stencil or mask in the form of the area or areas to be transparent and subsequently removing the stencil or mask and cured ink above it, in that the removal of residual unwanted pigment remaining in the transparent area or areas is relatively easily accomplished, typically by a vacuum airjet process. This retrieved pigment can be recycled, another advantage of the method. The prior art stencil method has only enabled the production of panels with a plurality of discrete printed areas, such as a pattern of dots or lines, because of the difficulty of removing cured ink in patterns having a plurality of transparent areas, as such removal is not progressive but requires initiation for each discrete area, whereas the present method only requires the removal of loose pigment particles.

The method is a cheaper method than the prior art methods of making durable decorated glass panels with ink of different colours in substantially exact registration, in particular because of the ease of removing pigment particles as opposed to cured ink. Products capable of being manufactured by the method include glass doors, windows, partitions, balustrades and signs in buildings, ships, trains and road vehicles.

The invention claimed is:

1. A method of making a glass panel that is partially printed with a plurality of layers in the form of a print pattern which subdivides the panel into a plurality of discrete printed areas and/or a plurality of discrete unprinted areas, said layers being in substantially exact registration, said method comprising:
   (i) applying a plurality of layers to a sheet of glass, wherein said applying comprises printing one of said layers comprising a ceramic ink comprising glass frit in the form of said print pattern, and printing another of said layers both within and outside said print pattern, wherein the another of said layers comprises first and second parts, wherein the first part is disposed within the print pattern, wherein the second part is disposed outside the print pattern, wherein the first and second parts each comprise pigment, wherein said printing comprises (a) printing the one of said layers in the form of said print pattern onto the sheet of glass such that said sheet of glass is devoid of said one of said layers outside said print pattern, or (b) printing the one of said layers in the form of said print pattern onto a decal carrier material and transferring said one of said layers in the form of a decal from said decal carrier material onto said sheet of glass such that said sheet of glass is devoid of said one of said layers outside said print pattern,
   (ii) subjecting said sheet of glass and said plurality of layers to a heat treatment process wherein said glass frit in said one of said layers melts and fuses with said sheet of glass and binds at least a portion of the pigment of the first part of the another of said layers within said print pattern, and
   (iii) removing at least a portion of the pigment of the second part of said another of said layers outside said print pattern by (a) burning off during said heat treatment process, and/or (b) vaporizing during said heat treatment process, and/or (c) a subsequent finishing process.

2. A method as claimed in claim 1, wherein, after (iii), a plurality of said plurality of layers are superimposed and are coterminous at a common length of boundary with a boundary between contiguous printed areas and unprinted areas of the print pattern.

3. A method as claimed in claim 1, wherein, after (iii), a plurality of said plurality of layers are single layers of different color and have boundaries to said print pattern which are spaced apart.

4. A method as claimed in claim 1, wherein said print pattern is defined by said one of said layers comprising a clear ceramic ink comprising said glass frit and resin matrix material.

5. A method as claimed in claim 1, wherein said one of said layers comprises a resin matrix and wherein the method further comprises applying a preliminary heat treatment to said one of said layers before the application of said another of said layers and before said subjecting of said sheet of glass and said plurality of layers to said heat treatment process, wherein said resin matrix is substantially removed from said one of said layers by said preliminary heat treatment.

6. A method as claimed in claim 1, wherein said glass frit in molten, liquid form migrates into said another of said layers.

7. A method as claimed in claim 1, wherein:
   said at least the portion of said another of said layers comprises said pigment,
   the heat treatment process binds said pigment to said sheet of glass within said print pattern, and
   said removing the parts of said another of said layers outside said print pattern removes said pigment outside said print pattern by said subsequent finishing process.

8. A method as claimed in claim 1, where said another of said layers comprises an ink comprising a binding matrix.

9. A method as claimed in claim 8, wherein said matrix comprises resin, and wherein said resin melts during said heat treatment process to form liquid resin.

10. A method as claimed in claim 9, wherein said liquid resin carries particles of said glass frit from said one of said layers into said another of said layers during said heat treatment process.

11. A method as claimed in claim 8, wherein said another of said layers does not comprise glass frit.

12. A method as claimed in claim 8, wherein the heat treatment process burns off said matrix, leaving said pigment of the second part of said another of said layers on said sheet of glass outside said print pattern prior to said removing of the at least a portion of the pigment of said another of said layers outside said print pattern.

13. A method as claimed in claim 1, wherein said print pattern is defined by a white ceramic ink comprising said glass frit and resin matrix material.

14. A method as claimed in claim 1, wherein said print pattern is defined by a black ceramic ink comprising said glass frit and resin matrix material.

15. A method as claimed in claim 1, wherein applying said plurality of layers to said sheet of glass comprises printing said plurality of layers onto said sheet of glass.

16. A method as claimed in claim 1, wherein applying said plurality of layers to said sheet of glass comprises transferring said plurality of layers in the form of the decal from the decal carrier material to the sheet of glass.

17. A method as claimed in claim 1, further comprising, after (iii), subjecting said sheet of glass to a glass toughening process comprising a further heat treatment process and subsequent cooling by cold air quenching.

18. A method as claimed in claim 1, wherein (iii) comprises removing the parts of said another of said layers outside said print pattern by the subsequent finishing process, and wherein said subsequent finishing process comprises applying a vacuum, water jetting, or air jetting.

19. A method as claimed in claim 1, wherein said pigment settles into molten glass frit.

20. A method as claimed in claim 1, wherein said printing of said one of said layers comprises printing said one of said layers onto one surface of the sheet of glass.

21. A method as claimed in claim 1, wherein said printing of said another of said layers comprises printing said another of said layers onto said sheet of glass and said printing of said one of said layers comprises printing said one of said layers onto a surface of said another of said layers remote from said sheet of glass.

22. A method as claimed in claim 1, wherein said printing of said one of said layers comprises printing said one of said layers intermediate said another of said layers and a further layer of said plurality of layers.

23. A method as claimed in claim 1, wherein (iii) comprises:
   burning off and vaporizing the parts of said another of said layers outside said print pattern during said heat treatment process;

burning off the parts of said another of said layers outside said print pattern during said heat treatment process, and removing the parts of said another of said layers outside said print pattern by a subsequent finishing process;

vaporizing the parts of said another of said layers outside said print pattern during said heat treatment process, and removing the parts of said another of said layers outside said print pattern by a subsequent finishing process; or burning off and vaporizing the parts of said another of said layers outside said print pattern during said heat treatment process, and removing the parts of said another of said layers outside said print pattern by a subsequent finishing process.

24. A method as claimed in claim 1, wherein said at least a portion of said first part of said another of said layers remains within said print pattern after said (a) burning, (b) vaporizing, or (c) removing.

25. A method as claimed in claim 24, wherein the at least a portion of said another of said layers comprises pigment that remains within said print pattern after said (a) burning, (b) vaporizing, or (c) removing.

26. A method as claimed in claim 1, wherein said applying of the plurality of layers to the sheet of glass comprises applying said another of said layers both within and outside of said print pattern.

27. The method of claim 1, wherein said subjecting of said sheet of glass and said plurality of layers to the heat treatment process does not cause said glass frit (a) to fuse with said sheet of glass outside said print pattern, or (b) bind said another of said layers outside said print pattern.

28. The method of claim 1, wherein, as viewed in a cross-section through the glass panel, the print pattern comprises alternate printed portions formed by said one of said layers comprising glass frit and unprinted portions devoid of said glass frit.

29. The method of claim 1, wherein removing the parts of said another of said layers outside said print pattern comprises removing all parts of said another of said layers outside said print pattern.

30. The method of claim 1, wherein:
the pigment of the second part remains on the sheet of glass outside the print pattern until after the completion of the heat treatment process.

31. The method of claim 1, wherein the plurality of layers other than the one of said layers are devoid of glass frit.

32. A method of making a glass panel that is partially printed with a plurality of layers in the form of a print pattern which subdivides the panel into a plurality of discrete printed areas and/or a plurality of discrete unprinted areas, said layers being in substantially exact registration, said method comprising:
(i) applying a plurality of layers to a sheet of glass, wherein said applying comprises printing one of said layers comprising a ceramic ink comprising glass frit in the form of said print pattern,
wherein said printing comprises (a) printing the one of said layers in the form of said print pattern onto the sheet of glass, or (b) printing the one of said layers in the form of said print pattern onto a decal carrier material and transferring said one of said layers in the form of a decal from said decal carrier material onto said sheet of glass, and
wherein said applying comprises applying another of said layers both within and outside said print pattern, wherein the another of said layers comprises first and second parts, wherein the first part is disposed within the print pattern, wherein the second part is disposed outside the print pattern, wherein the first and second parts each comprise pigment; and (ii) subjecting said sheet of glass and said plurality of layers to a heat treatment process that melts said glass frit, fuses said glass frit with said sheet of glass and the first part of said another layer, and binds at least a portion of said first part of said another of said layers to said sheet of glass within said print pattern more strongly than the second part of said another of said layers binds to said sheet of glass outside said print pattern, and (iii) removing at least a portion of the second part of said another of said layers outside said print pattern.

33. The method of claim 32, wherein said removing comprises removing the at least a portion of the second part of said another of said layers outside said print pattern by (a) burning off during said heat treatment process, (b) vaporizing during said heat treatment process, or (c) a subsequent finishing process.

34. The method of claim 32, wherein said removing comprises removing the at least a portion of the second part of said another of said layers outside said print pattern after the completion of said heat treatment process.

35. The method of claim 32, wherein said subjecting of said sheet of glass and said plurality of layers to the heat treatment process causes (a) said glass frit to melt, fuse with said sheet of glass, migrate into the first part of said another of said layers, and bind at least a portion of said first part of said another of said layers to said one of said layers and to said sheet of glass within said print pattern, and (b) said glass frit not to migrate into said second part of said another of said layers outside said print pattern or bind said second part of said another of said layers to said sheet of glass outside said print pattern.

36. A method of making a glass panel that is partially printed with a plurality of layers in the form of a print pattern which subdivides the panel into a plurality of discrete printed areas and/or a plurality of discrete unprinted areas, said method comprising, in sequence:
(i) applying a plurality of layers to a sheet of glass, wherein said applying comprises printing one of said layers comprising a ceramic ink comprising glass frit in the form of said print pattern, and wherein said applying comprises applying another of said layers comprising pigment both within and outside said print pattern, (ii) subjecting said sheet of glass and said plurality of layers to a heat treatment process wherein said glass frit melts and fuses with said sheet of glass and binds said pigment within the print pattern to said sheet of glass within the print pattern more strongly than said pigment outside the print pattern binds to said sheet outside the print pattern, and (iii) removing said pigment outside said print pattern from said sheet of glass.

37. The method of claim 36, wherein, as viewed in a cross-section through the glass panel, the print pattern comprises alternate printed portions formed by said one of said layers comprising glass frit and unprinted portions devoid of said glass frit.

38. The method of claim 36, wherein said another of said layers does not comprise glass frit.

39. The method of claim 36, wherein said printing of said one of said layers comprises printing the one of said layers in the form of said print pattern onto the sheet of glass.

40. The method of claim 36, wherein said printing of said one of said layers comprises printing the one of said layers in the form of said print pattern onto a decal carrier material and transferring said one of said layers in the form of a decal from said decal carrier material onto said sheet of glass.

\* \* \* \* \*